United States Patent
Okura et al.

(10) Patent No.: US 12,304,078 B2
(45) Date of Patent: May 20, 2025

(54) ROBOT CONTROL SYSTEM, CONTROL PROGRAM, AND CONTROL METHOD

(71) Applicant: OMRON CORPORATION, Kyoto (JP)

(72) Inventors: Takafumi Okura, Kyoto (JP); Masahiko Nakano, Kyoto (JP); Kei Yasuda, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 248 days.

(21) Appl. No.: 17/928,552

(22) PCT Filed: Mar. 5, 2021

(86) PCT No.: PCT/JP2021/008678
§ 371 (c)(1),
(2) Date: Nov. 29, 2022

(87) PCT Pub. No.: WO2021/261025
PCT Pub. Date: Dec. 30, 2021

(65) Prior Publication Data
US 2023/0211505 A1    Jul. 6, 2023

(30) Foreign Application Priority Data

Jun. 25, 2020  (JP) ................. 2020-109514

(51) Int. Cl.
*B25J 9/16*    (2006.01)
*B25J 19/02*   (2006.01)

(52) U.S. Cl.
CPC ........... *B25J 9/1641* (2013.01); *B25J 9/1653* (2013.01); *B25J 9/1697* (2013.01); *B25J 19/023* (2013.01)

(58) Field of Classification Search
CPC ...... B25J 9/1653; B25J 9/1641; B25J 9/1697; B25J 9/1687; B25J 19/023; B25J 9/1692;
(Continued)

(56) References Cited

U.S. PATENT DOCUMENTS 6,430,472 B1    8/2002  Boillot et al.
9,757,859 B1*   9/2017  Kolb ................. B25J 5/007
(Continued)

FOREIGN PATENT DOCUMENTS

CN    1492668 A    4/2004
CN    101612735 A  12/2009
(Continued)

OTHER PUBLICATIONS

Extended European Search Report dated Jun. 11, 2024, issued in European Application No. 21829000.5.
(Continued)

*Primary Examiner* — Khoi H Tran
*Assistant Examiner* — Tanner L Cullen
(74) *Attorney, Agent, or Firm* — Sughrue Mion, PLLC

(57) ABSTRACT

A robot control system includes: a robot on which a camera and a hand for gripping a first workpiece are mounted; a displacement generation mechanism disposed between a tip of the robot and the camera; a first control module configured to provide the robot with a control instruction for causing the first workpiece to approach a second workpiece; a vibration calculation module configured to calculate magnitude of vibration caused in the camera when the robot causes the first workpiece to approach the second workpiece; and a second control module configured to provide the displacement generation mechanism with a control instruction for compensating for the vibration calculated by the vibration calculation module.

17 Claims, 20 Drawing Sheets

(58) Field of Classification Search
CPC ...... B25J 9/1638; B25J 19/04; B25J 15/0095;
G05B 2219/39199; G05B 2219/40617;
G05B 2219/45063; G05B 2219/40053;
G05B 2219/39484; G05B 2219/39473;
G05B 2219/39536; G05B 2219/40607;
G05B 2219/50362
See application file for complete search history.

(56) References Cited

U.S. PATENT DOCUMENTS

| | | |
|---|---|---|
| 2005/0185945 A1 | 8/2005 | Zhang et al. |
| 2008/0129829 A1* | 6/2008 | Shin ................ H04N 23/68 348/208.1 |
| 2010/0312393 A1* | 12/2010 | Someya ............. B25J 9/1697 700/259 |
| 2011/0004343 A1 | 1/2011 | Iida |
| 2012/0059391 A1 | 3/2012 | Diolaiti et al. |
| 2013/0050590 A1* | 2/2013 | Nobutani .......... H04N 9/3194 348/742 |
| 2017/0163895 A1* | 6/2017 | Ryu .................. H04N 23/6812 |
| 2017/0248971 A1* | 8/2017 | Wei .................. G05D 1/0094 |
| 2018/0229364 A1 | 8/2018 | Wang et al. |
| 2018/0281186 A1 | 10/2018 | Hiraide et al. |
| 2020/0023521 A1 | 1/2020 | Dan |
| 2020/0070370 A1* | 3/2020 | Wakabayashi ........ B25J 9/1697 |
| 2020/0306957 A1* | 10/2020 | Oono .................. B25J 15/0019 |

FOREIGN PATENT DOCUMENTS

| | | |
|---|---|---|
| CN | 206982739 U | 2/2018 |
| CN | 108422420 A | 8/2018 |
| CN | 110640744 A | 1/2020 |
| JP | 10-224095 A | 8/1998 |
| JP | 2001-036295 A | 2/2001 |
| JP | 2002-076695 A | 3/2002 |
| JP | 2010-162630 A | 7/2010 |
| JP | 2011-110628 A | 6/2011 |
| JP | 2015-506850 A | 3/2015 |
| JP | 2020-11339 A | 1/2020 |
| WO | 2018/209592 A1 | 11/2018 |
| WO | 2020/017426 A1 | 1/2020 |

OTHER PUBLICATIONS

International Search Report for PCT/JP2021/008678 dated May 18, 2021.
Written Opinion for PCT/JP2021/008678 dated May 18, 2021.
Communication dated Jan. 2, 2025 issued by China Patent Office in Application No. 202180037025.7.

* cited by examiner

FIG.20

| CONFIGURATION EXAMPLE NUMBER | SERVO MOTOR | SERVO CONTROLLER | CONTROL DEVICE | ROBOT CONTROLLER | FIRST ROBOT |
|---|---|---|---|---|---|
| 1 | — | SA, MC | MC, LD, RC | RC, RA | — |
| 2 | — | SA, MC, LD, RC (INTEGRATION) | | RC, RA | — |
| 3 | — | SA, MC | MC, LD, RC, RA (INTEGRATION) | | — |
| 4 | — | SA, MC | MC, LD, RC | RC, RA (INTEGRATION) | — |
| 5 | — | SA, MC, LD, RC, RA (INTEGRATION) | | | — |
| 6 | — | SA, MC | MC, LD, RC, RA (INTEGRATION) | | — |
| 7 | — | SA, MC, LD, RC (INTEGRATION) | | RC, RA (INTEGRATION) | — |
| 8 | — | | SA, MC, LD, RC, RA (INTEGRATION) | | — |
| 9 | SA, MC (INTEGRATION) | | MC, LD, RC | RC, RA | |
| 10 | SA, MC (INTEGRATION) | | MC, LD, RC, RA (INTEGRATION) | | |
| 11 | SA, MC (INTEGRATION) | | MC, LD, RC | RC, RA (INTEGRATION) | |
| 12 | SA, MC (INTEGRATION) | | MC, LD, RC, RA (INTEGRATION) | | |
| 13 | SA, MC, LD, RC (INTEGRATION) | | | RC, RA | |
| 14 | SA, MC, LD, RC (INTEGRATION) | | | RC, RA (INTEGRATION) | |
| 15 | SA, MC, LD, RC, RA (INTEGRATION) | | | | |
| 16 | | SA, MC, LD, RC, RA (INTEGRATION) | | | |

ROBOT CONTROL SYSTEM, CONTROL PROGRAM, AND CONTROL METHOD

This Application is a National Stage of International Application No. PCT/JP2021/008678 filed Mar. 5, 2021, claiming priority based on Japanese Patent Application No. 2020-109514 filed Jun. 25, 2020, the contents of each of which being herein incorporated by reference in their entireties.

TECHNICAL FIELD

The present technique relates to a robot control system, a control program, and a control method.

BACKGROUND ART

In a factory automation (FA) field, robots are used for various applications. An example in which a combination with a visual sensor is used for component assembly, mounting, and the like is known as an example of the application.

For example, Japanese Patent Laying-Open No. 2001-036295 (PTL 1) discloses a component mounting device in which real images of a mounting component and a mounting substrate are superimposed on each other by an imaging unit and relative positions of the mounting component and the mounting substrate are adjusted while captured images of the mounting component and the mounting substrate are visually recognized.

Japanese Patent Laying-Open No. 10-224095 (PTL 2) discloses an electronic component mounting method capable of accurately mounting a component on a printed circuit board even when an influence of vibration increases in an electronic component mounting device operated at a high speed.

Japanese Patent Laying-Open No. 2002-076695 (PTL 3) discloses an electronic component mounting method capable of securing a relative position between a plurality of components with high accuracy.

CITATION LIST

Patent Literatures

PTL 1: Japanese Patent Laying-Open No. 2001-036295
PTL 2: Japanese Patent Laying-Open No. 10-224095
PTL 3: Japanese Patent Laying-Open No. 2002-076695

SUMMARY OF INVENTION

Technical Problem

The technique disclosed in PTLs 1 to 3 adopts a method for previously measuring and correcting a component position error caused in assembly or mounting. According to such the method, only a statically generated position error can be corrected, but a dynamic position error caused due to various factors cannot be coped with.

An object of the present technique is to provide a robot control system capable of performing positioning control with higher accuracy.

Solution to Problem

A robot control system according to an embodiment of the present technique includes: a robot on which a camera and a hand for gripping a first workpiece are mounted; a displacement generation mechanism disposed between a tip of the robot and the camera; a first control module configured to provide the robot with a control instruction for causing the first workpiece to approach a second workpiece; a vibration calculation module configured to calculate magnitude of vibration caused in the camera when the robot causes the first workpiece to approach the second workpiece; and a second control module configured to provide the displacement generation mechanism with a control instruction for compensating for the vibration calculated by the vibration calculation module.

According to this configuration, when the robot that moves the first workpiece is moved at a high speed, the magnitude of the vibration of the camera caused at the tip of the robot is calculated, and the control instruction is provided to the displacement generation mechanism disposed between the tip of the robot and the camera to compensate for the calculated magnitude based on the calculated magnitude of the vibration of the camera. In this way, more accurate positioning control can be implemented by the combination of the robot and the displacement generation mechanism.

The vibration calculation module may calculate the magnitude of the vibration caused in the camera based on a state value of a movable module of the robot. According to this configuration, the magnitude of the vibration can be calculated with a small calculation amount based on the state value of the movable module of the robot.

The vibration calculation module may calculate the magnitude of the vibration caused in the camera based on an image captured by the camera. According to this configuration, the magnitude of the dynamically-generated vibration can be calculated using the image captured by the camera.

The vibration calculation module may calculate a moving speed of the first workpiece based on the image captured by the camera, and calculates an original position of the first workpiece from the calculated moving speed of the first workpiece. According to this configuration, the original position of the first workpiece can be more appropriately calculated by calculating the moving speed of the first workpiece.

The vibration calculation module may calculate an error vector that is deviation between a current position of the first workpiece and the original position of the first workpiece. According to this configuration, the magnitude and direction of the vibration can be estimated using the error vector.

The robot may be a vertical articulated robot. The displacement generation mechanism may include an orthogonal mechanism. According to this configuration, the first workpiece can be approached from various directions, and the control for the second robot can be simplified.

The first control module, the vibration calculation module, and the second control module may perform processing in synchronization with each other at a predetermined period. According to this configuration, the calculation of the control instruction to the robot and the displacement generation mechanism can be performed in synchronization with each other, so that control accuracy in the case where the robot and the displacement generation mechanism are linked can be enhanced.

The first control module may acquire the current position of the robot while excluding an influence of the control instruction provided to the displacement generation mechanism. According to this configuration, the image captured by the camera is offset by the displacement generated by the displacement generation mechanism, so that the influence of the offset can be eliminated.

According to another embodiment of the present technique, there is provided a control program executed by a computer of a robot control system including a robot on which a camera and a hand for gripping a first workpiece are mounted and a displacement generation mechanism disposed between a tip of the robot and the camera. The control program causes the computer to execute: providing the robot with a control instruction for causing the first workpiece to approach a second workpiece; calculating magnitude of vibration caused in the camera when the robot causes the first workpiece to approach the second workpiece; and providing the displacement generation mechanism with a control instruction for compensating for the calculated vibration.

According to still another embodiment of the present technique, there is provided a control method executed in a robot control system including a robot on which a camera and a hand for gripping a first workpiece are mounted and a displacement generation mechanism disposed between a tip of the robot and the camera. The control method includes: providing the robot with a control instruction for causing the first workpiece to approach a second workpiece; calculating magnitude of vibration caused in the camera when the robot causes the first workpiece to approach the second workpiece; and providing the displacement generation mechanism with a control instruction for compensating for the calculated vibration.

Advantageous Effects of Invention

According to the present technique, the robot control system capable of performing positioning control with higher accuracy can be implemented.

BRIEF DESCRIPTION OF DRAWINGS

FIG. 18(a) illustrates an example of an image captured at time t=t1 and FIGS. 18(b) and 18(c) illustrate examples of images captured at time t=t2.

FIG. 20 is a view illustrating a part of a variation in the configuration example of the robot control system of the embodiment.

DESCRIPTION OF EMBODIMENT

Figure 1:
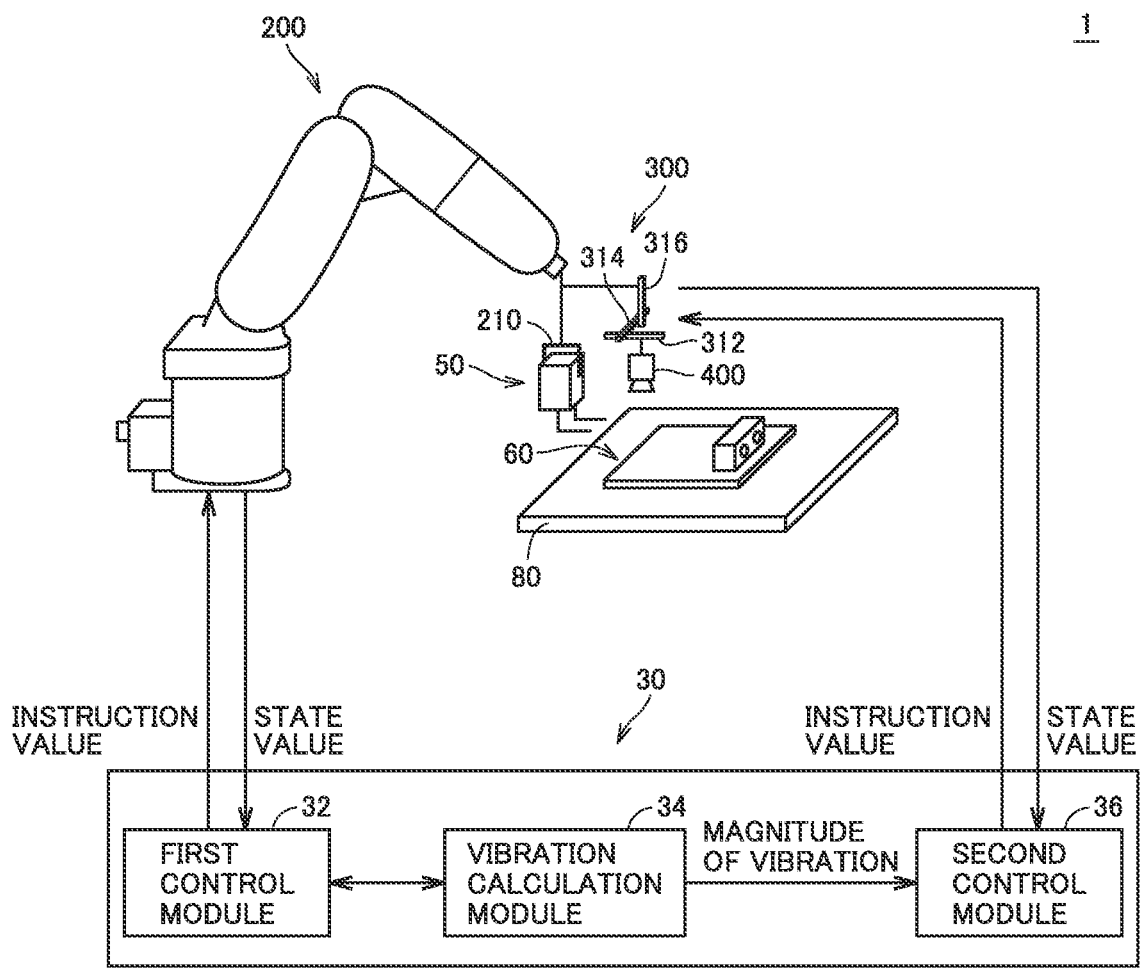
FIG. 1 is a schematic diagram illustrating an outline of a robot control system according to an embodiment.

With reference to the drawings, an embodiment of the technique will be described in detail. The same or equivalent part in the drawings is denoted by the same reference numeral, and the description will not be repeated.

A. APPLICATION EXAMPLE

An example of a scene to which the technique is applied will be described. FIG. 1 is a schematic diagram illustrating an outline of a robot control system 1 according to an embodiment.

With reference to FIG. 1, a robot control system 1 of the embodiment includes a robot 200 on which a camera 400 and a hand 210 for gripping a first workpiece 50 are mounted. Robot 200 causes first workpiece 50 gripped by hand 210 to approach a second workpiece 60. Second workpiece 60 may be disposed on a work table 80.

Robot control system 1 includes a displacement generation mechanism 300 disposed between a tip of robot 200 and camera 400. displacement generation mechanism 300 generates displacement between the tip of robot 200 and camera 400.

Robot control system 1 includes a control module 30 controlling robot control system 1. Control module 30 may be implemented in any implementation form.

More specifically, control module 30 includes a first control module 32, a vibration calculation module 34, and a second control module 36.

First control module 32 is a control logic that is in charge of controlling robot 200, and provides robot 200 with a control instruction such that first workpiece 50 approaches second workpiece 60. In addition, first control module 32 acquires a state value (for example, encoder information indicating a position of each joint) from robot 200.

Vibration calculation module 34 calculates magnitude of vibration caused in camera 400 when robot 200 causes first workpiece 50 to approach second workpiece 60.

Second control module 36 is a control logic in charge of controlling displacement generation mechanism 300, and acquires the state value (for example, encoder information indicating the position of each axis) from displacement generation mechanism 300 while providing displacement generation mechanism 300 with the control instruction. In particular, second control module 36 provides displacement generation mechanism 300 with the control instruction for compensating for the magnitude of the vibration calculated by vibration calculation module 34.

As a method for calculating the magnitude of the vibration, for example, a method based on the state value of a movable portion of robot 200 may be adopted, or a method based on an image captured by camera 400 may be adopted.

In a process in which robot 200 conveys first workpiece 50, the magnitude of the vibration caused in camera 400 disposed at the tip of robot 200 is sequentially calculated, and displacement generation mechanism 300 is controlled based on the calculated magnitude of the vibration, whereby blurring in the image captured by camera 400 can be compensated for to further enhance control accuracy of robot 200.

B. OVERALL CONFIGURATION EXAMPLE

An overall configuration example of robot control system 1 of the embodiment will be described below.

Figure 2:
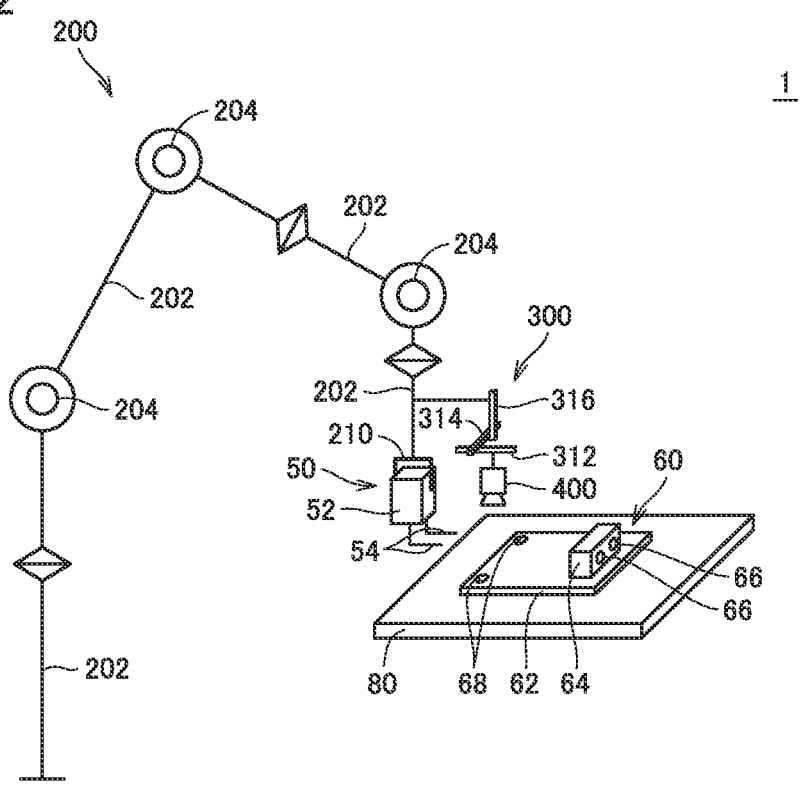
FIG. 2 is a schematic diagram illustrating an overall configuration of the robot control system of the embodiment.

FIG. 2 is a schematic diagram illustrating the overall configuration of robot control system 1 of the embodiment. FIG. 2 illustrates, an application assembling two components as an example.

More specifically, robot control system 1 includes robot 200 that grips and moves first workpiece 50. A hand 210 for gripping first workpiece 50 and camera 400 are mounted at the tip of robot 200. Based on information obtained from the image captured by camera 400, robot 200 assembles first workpiece 50 to second workpiece 60 disposed on work table 80.

First workpiece 50 includes an electronic component 52 including a pair of pins 54. Second workpiece 60 includes a substrate 62 and electronic component 64 disposed on substrate 62. A pair of holes 66 inserted into the pair of pins 54 is made in electronic component 64. A positioning marker 68 is provided on substrate 62. The positioning marker 68 is optically recognized by imaging of camera 400.

Typically, a vertical articulated robot is used as robot 200. When the vertical articulated robot is used, robot 200 includes a plurality of links 202 and a joint 204 connecting links 202. Joint 204 may also be referred to as a shaft, and is driven by a drive source such as a servomotor. Joint 204 of robot 200 is mechanically coupled to a drive source (not illustrated), and a relative position or an absolute position of joint 204 can be detected by a sensor (typically, an encoder) attached to the drive source or joint 204.

Robot 200 is not limited to the vertical articulated robot, but any robot such as a horizontal articulated (scalar) robot or a parallel link robot can be used.

Hand 210 is directly connected to the tip of robot 200, and camera 400 is connected to the tip of robot 200 with displacement generation mechanism 300 interposed therebetween. Displacement generation mechanism 300 generates displacement in order to reduce the vibration caused in camera 400. Any mechanism may be adopted as long as the vibration caused in camera 400 is reduced. FIG. 2 includes an orthogonal mechanism that generates the displacement in a plurality of axial directions (for example, three axes of an X-axis, a Y-axis, and a Z-axis) orthogonal to each other as an example of displacement generation mechanism 300.

More specifically, displacement generation mechanism 300 includes movable shafts 312, 314, 316 in which positions are changeable in the directions orthogonal to each other. Each of movable shafts 312, 314, 316 moves in the corresponding axial direction to be able to move mechanically connected hand 210 in any three axial directions (X-axis, Y-axis, Z-axis).

Movable shafts 312, 314, 316 of displacement generation mechanism 300 are mechanically coupled to a servomotor 330 (see FIG. 5 and the like), and relative positions or absolute positions of movable shafts 312, 314, 316 can be detected by servomotor 330 or sensors (typically, encoders) attached to movable shafts 312, 314, 316.

C. PROBLEM AND SOLUTION

Some problems caused in an assembly application using the robot will be described below.

Figure 3:
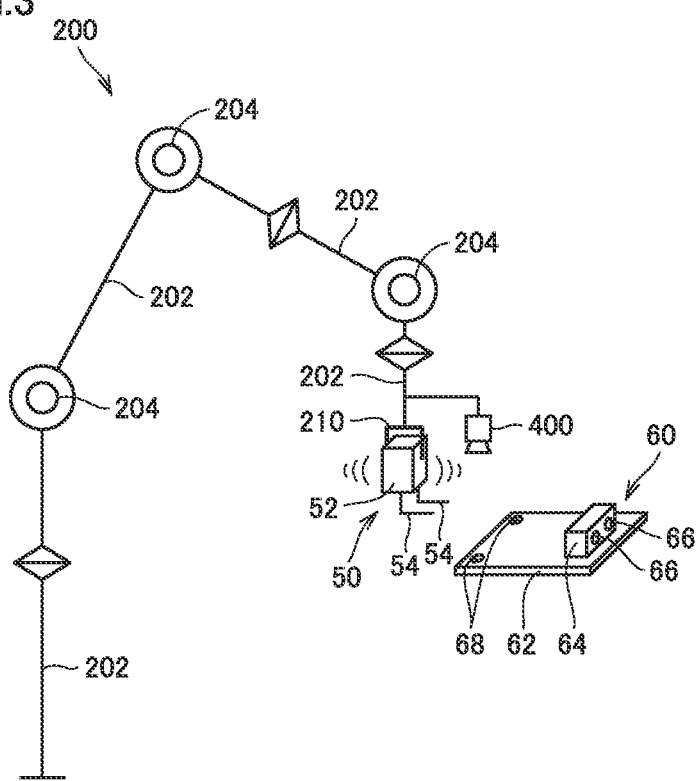
FIG. 3 is a view illustrating a problem caused in an assembly application using a robot.

FIG. 3 is a view illustrating the problem caused in the assembly application using the robot. With reference to FIG. 3, a configuration in which the current position of a target component is specified by image recognition using camera 400 to enhance the control accuracy is adopted in the assembly application using robot 200. In particular, the control accuracy of robot 200 can be further enhanced by disposing camera 400 at the tip (hand) of robot 200.

For example, the approach in the horizontal direction or the oblique direction is required in order to insert the pair of pins 54 extending from first workpiece 50 including electronic component 52 into the pair of holes 66 made in second workpiece 60. As described above, in order to assemble the components, the tip of robot 200 is required to be moved not only in the vertical direction but also in various directions including the horizontal direction and the oblique direction. At this point, camera 400 mechanically connected to the tip of robot 200 also moves in various directions. Furthermore, when robot 200 is moved at a high speed, the vibration may also be caused in robot 200 itself, and the vibration can also be caused in camera 400. For this reason, a visual field range of camera 400 is not stabilized, and an error may be caused in a recognition result, so that positioning accuracy is also degraded. That is, under an influence of the vibration caused in camera 400, a tact time related to the assembly of the components is prevented from significantly shortening.

Figure 4:
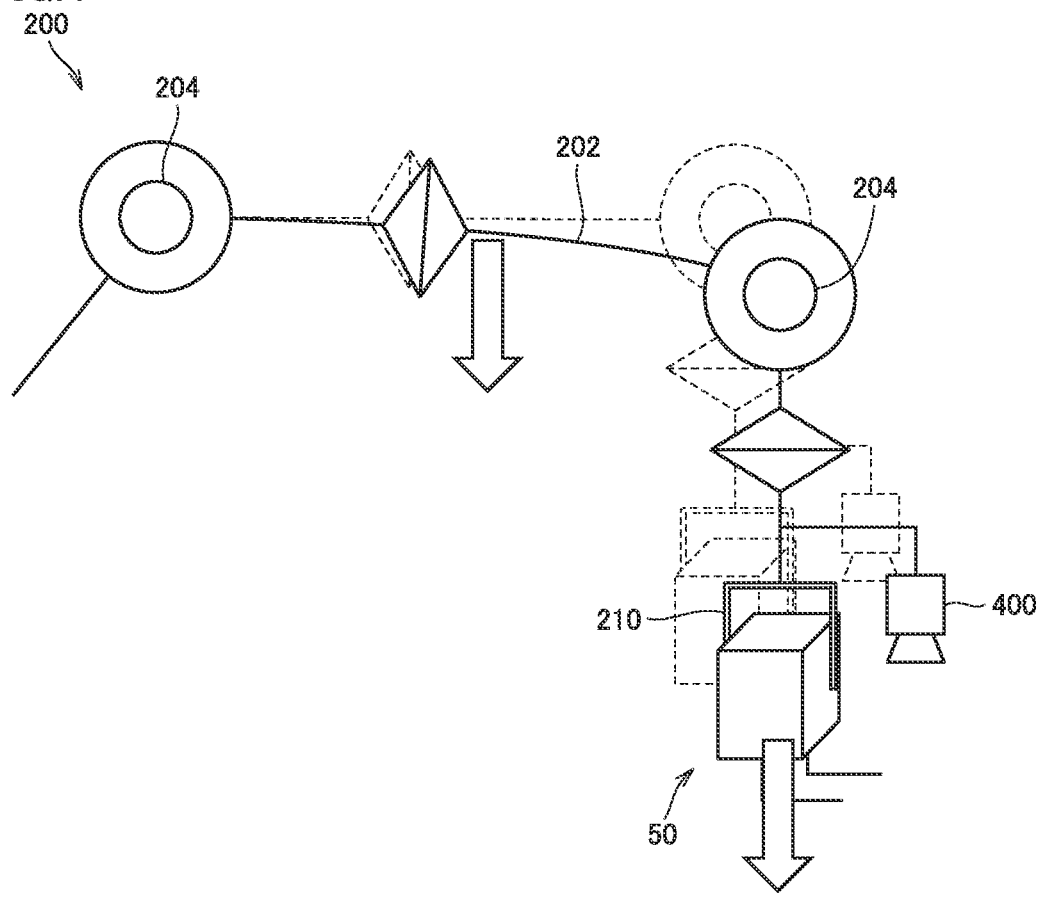
FIG. 4 is a view illustrating another problem caused in the assembly application using the robot.

FIG. 4 is a view illustrating another problem caused in the assembly application using the robot. With reference to FIG. 4, when robot 200 grips and moves the workpiece, link 202 is deflected due to a weight of robot 200 and a weight of the grasped workpiece, and the positions of hand 210 and camera 400 mounted in the tip are also deviated from a design value.

For the problem described above, in robot control system 1 of the embodiment, robot 200 having a relatively high degree of freedom in movement is adopted, and displacement generation mechanism 300 reducing the influence of the vibration on camera 400 disposed at the tip of robot 200 is additionally disposed. Even when robot 200 moves at the high speed, the accuracy of the image recognition using camera 400 can be maintained by adopting such the configuration. That is, for example, using robot 200 such as the vertical articulated robot and displacement generation mechanism 300 capable of performing positioning at the high speed and high accuracy, the image blurring due to the vibration of the tip (hand) of robot 200 can be compensated for to implement the high-speed, high-accuracy assembly work in which disturbance of the image of camera 400 is prevented. Thus, the tact time related to the assembly of the components can be shortened.

D. SYSTEM CONFIGURATION EXAMPLE

A system configuration example of robot control system 1 of the embodiment will be described below.

Figure 5:
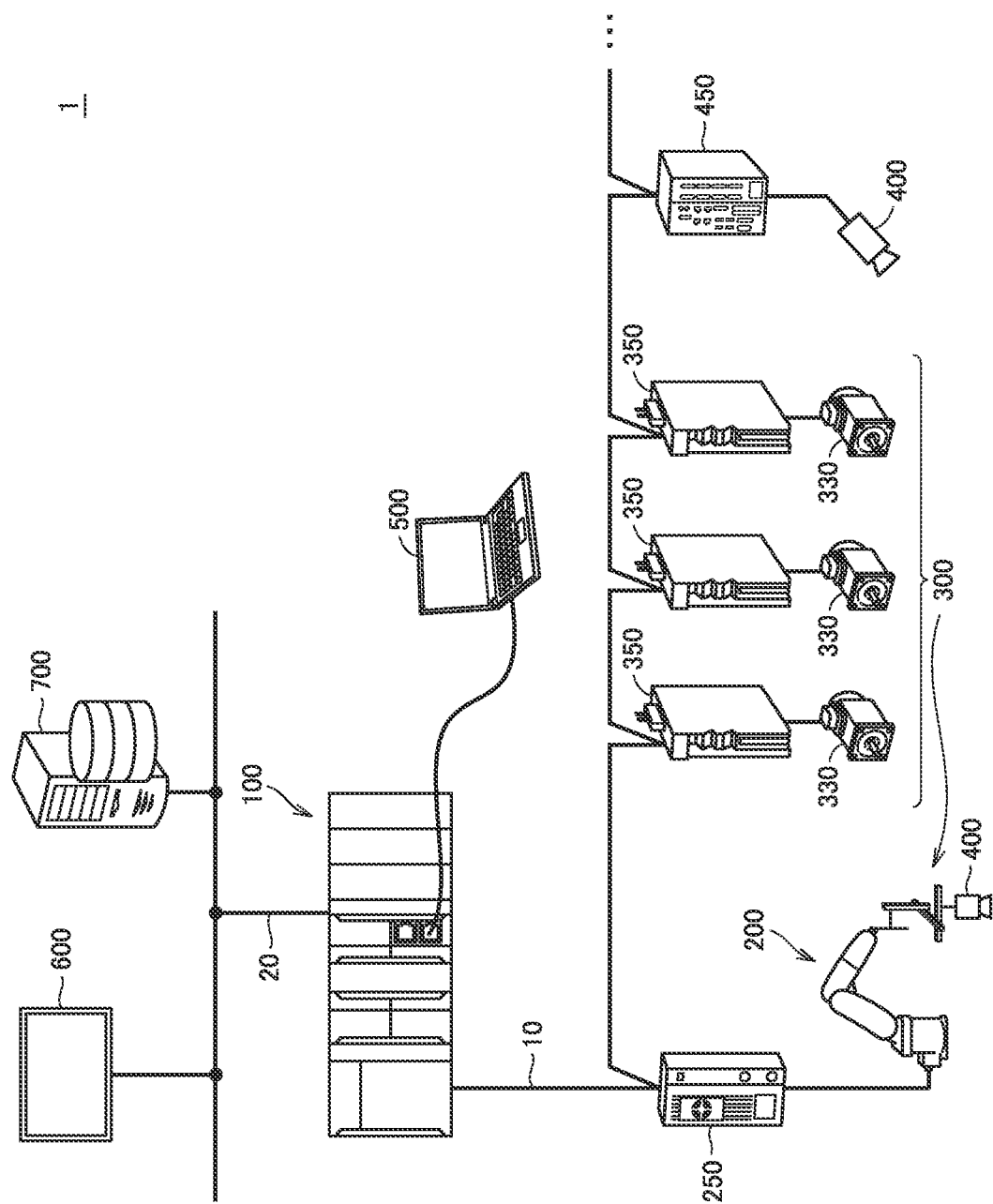
FIG. 5 is a schematic diagram illustrating a system configuration of the robot control system of the embodiment.

FIG. 5 is a schematic diagram illustrating the system configuration of robot control system 1 of the embodiment. With reference to FIG. 5, robot control system 1 includes a control device 100, a robot controller 250, a servo controller 350, and an image processing device 450 that are network-connected to control device 100 through a field network 10.

Control device 100 exchanges data with a device connected to the field network 10 and performs processing as described later. Typically, control device 100 may be implemented by a programmable logic controller (PLC).

Robot controller 250 is in charge of controlling robot 200. More specifically, robot controller 250 functions as an interface with robot 200, outputs the instruction to drive robot 200 according to the instruction from control device 100, acquires the state value of robot 200, and outputs the state value to control device 100.

Servo controller 350 is in charge of controlling servomotor 330 that drives the shaft of displacement generation mechanism 300. More specifically, servo controller 350 functions as the interface with displacement generation mechanism 300, and outputs the instruction to drive one shaft constituting displacement generation mechanism 300 to corresponding servomotor 330 according to the instruction from control device 100, acquires the state value of corresponding servomotor 330 of displacement generation mechanism 300, and outputs the state value to control device 100.

Image processing device 450 performs various types of image recognition processing on the image captured by camera 400. In robot control system 1 of the embodiment, image processing device 450 detects the position of second workpiece 60 by, for example, performing searching processing for marker 68.

EtherCAT (registered trademark), EtherNet/IP, or the like, which is an industrial network protocol, can be used for field network 10. When EtherCAT is adopted as the protocol, for example, the data can be exchanged between control device 100 and the device connected to field network 10 at a constant period of several hundred microseconds to several milliseconds. By exchanging the data in such the constant period, robot 200 and displacement generation mechanism 300 that are included in robot control system 1 can be controlled at the high speed and with the high accuracy.

Control device 100 may be connected to display device 600 and server device 700 through a higher-order network 20. EtherNet/IP or the like that is the industrial network protocol can be used for higher-order network 20.

A support device 500 may be connected to control device 100 in order to install a user program executed by control device 100 and perform various settings.

E. HARDWARE CONFIGURATION EXAMPLE

A hardware configuration example of a main device constituting robot control system 1 in FIG. 5 will be described below.

(e1: Control Device 100)

Figure 6:
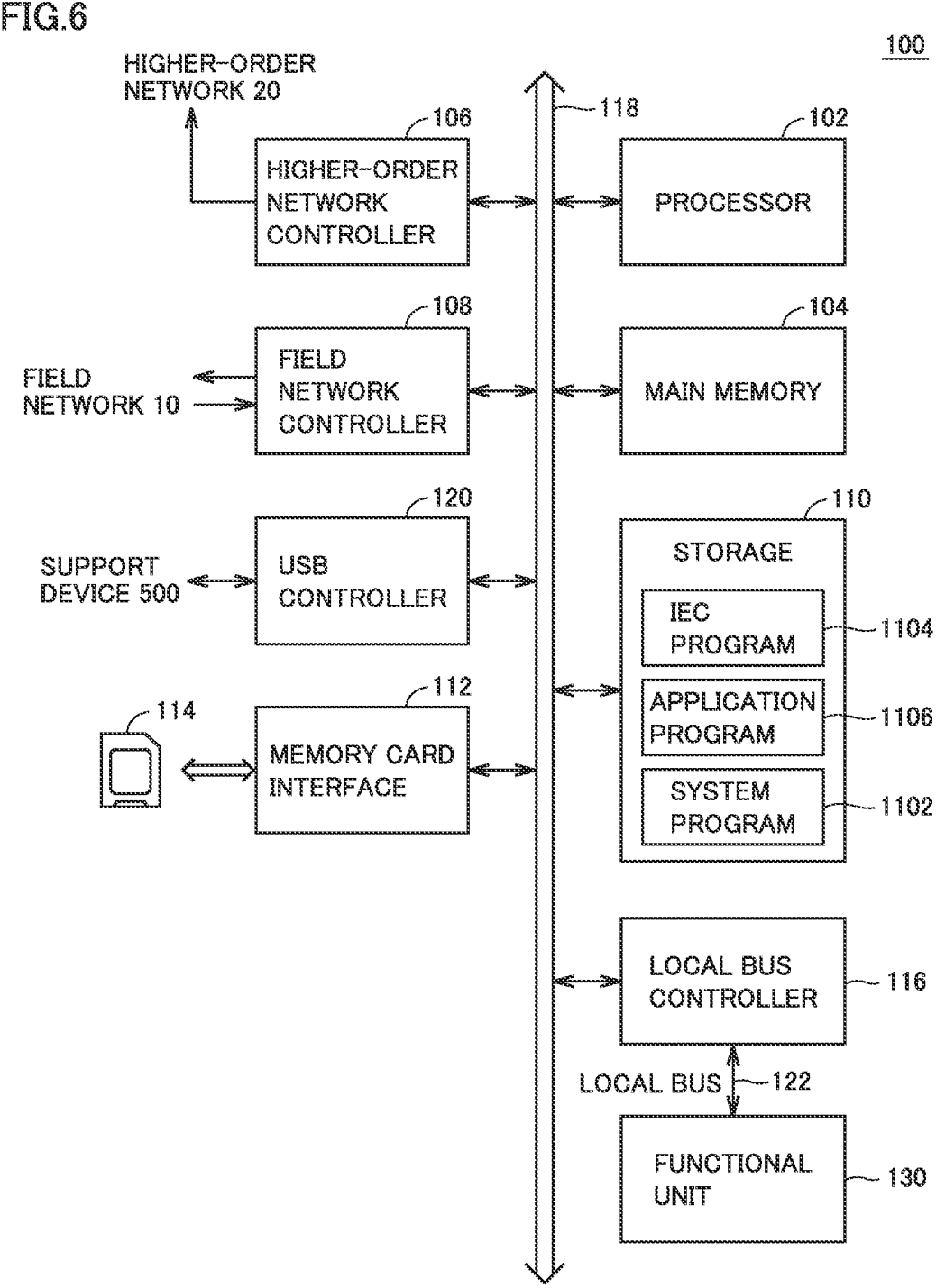
FIG. 6 is a schematic diagram illustrating a hardware configuration example of a control device constituting the robot control system of the embodiment.

FIG. 6 is a schematic diagram illustrating the hardware configuration example of control device 100 constituting robot control system 1 of the embodiment. As illustrated in FIG. 6, control device 100 includes a processor 102, a main memory 104, a storage 110, a memory card interface 112, a higher-order network controller 106, a field network controller 108, a local bus controller 116, and a universal serial bus (USB) controller 120 that provides a USB interface. These components are connected to each other through a processor bus 118.

Processor 102 corresponds to an arithmetic processing unit that executes control arithmetic operation, and is constituted of a central processing unit (CPU), a graphics processing unit (GPU), and the like. Specifically, processor 102 reads various programs stored in storage 110, expands the various programs in main memory 104, and executes the various programs, thereby implementing the control arithmetic operation for the control target.

Main memory 104 is constructed with a volatile storage device such as a dynamic random access memory (DRAM) or a static random access memory (SRAM). Storage 110 is constructed with a nonvolatile storage device such as a solid state drive (SSD) or a hard disk drive (HDD).

A system program 1102 implementing a basic function, an International Electrotechnical Commission (IEC) program 1104 produced according to the control target, and an application program 1106 are stored in storage 110.

IEC program 1104 includes a command group required for implementing the assembly processing in robot control system 1 of the embodiment. Typically, IEC program 1104 can include a sequence command and a motion command. IEC program 1104 may be described in any language defined by IEC 61131-3 defined by International Electrotechnical Commission (IEC). However, the IEC program 1104 may include a program described in a manufacturer own language other than the language defined by IEC 61131-3.

Application program 1106 includes the command controlling the operation of robot 200 and/or displacement generation mechanism 300. Application program 1106 may include the command described in a predetermined programming language (for example, a programming language for robot control such as V+ language or a programming language related to NC control such as G code).

Control module 30 (first control module 32, vibration calculation module 34, and second control module 36) illustrated in FIG. 1 may be implemented by IEC program 1104 and/or application program 1106 being executed by processor 102.

Memory card interface 112 receives memory card 114 that is an example of a detachable recording medium. Memory card interface 112 can read and write any data from and in memory card 114.

Higher-order network controller 106 exchanges the data with any information processing device (display device 600, server device 700, and the like in FIG. 5) through higher-order network 20.

Field network controller 108 exchanges the data with each device through field network 10. In the system configuration example of FIG. 5, field network controller 108 may function as a communication master of field network 10.

Local bus controller 116 exchanges the data with any functional unit 130 included in control device 100 through a local bus 122. For example, functional unit 130 includes an analog I/O unit that is responsible for inputting and/or outputting an analog signal, a digital I/O unit that is responsible for inputting and/or outputting a digital signal, and a counter unit that receives a pulse from an encoder.

USB controller 120 exchanges the data with any information processing device (support device 500) through the USB connection.

(e2: Robot Controller 250)

Figure 7:
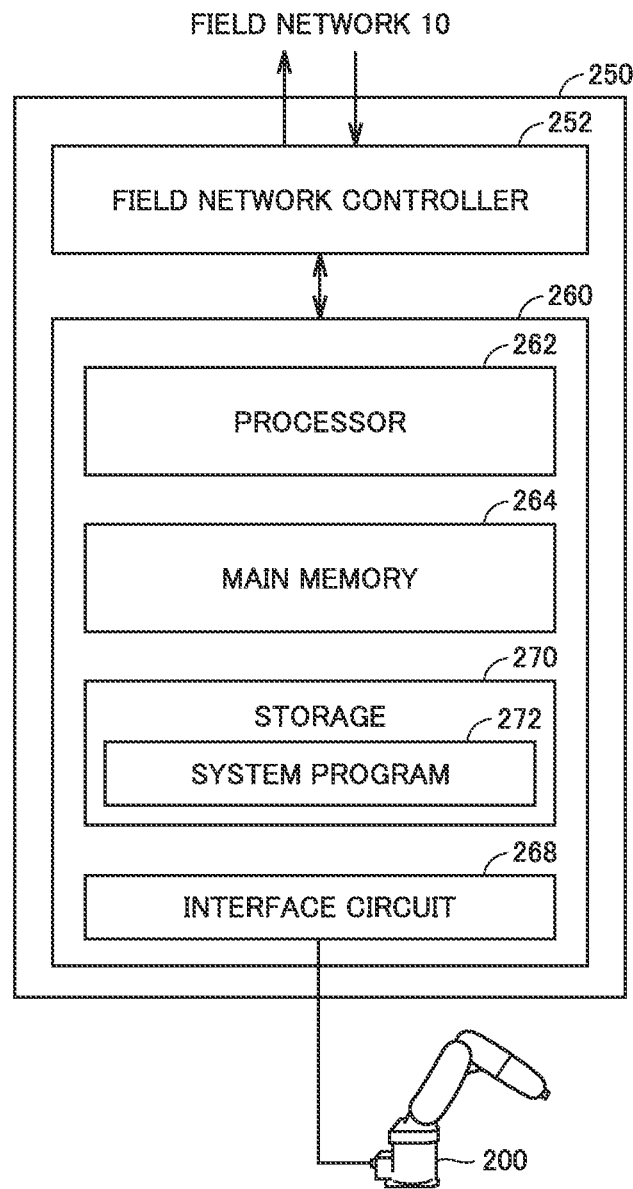
FIG. 7 is a schematic diagram illustrating a hardware configuration example of a robot controller constituting the robot control system of the embodiment.

FIG. 7 is a schematic diagram illustrating a hardware configuration example of robot controller 250 constituting robot control system 1 of the embodiment. With reference to FIG. 7, robot controller 250 includes a field network controller 252 and a control processing circuit 260.

Field network controller 252 mainly exchanges the data with control device 100 through field network 10.

Control processing circuit 260 performs arithmetic processing required for driving robot 200. As an example, control processing circuit 260 includes a processor 262, a main memory 264, a storage 270, and an interface circuit 268.

Processor 262 executes the control arithmetic operation driving robot 200. Main memory 264 is constituted of a volatile storage device such as a DRAM or an SRAM. For example, storage 270 includes a non-volatile storage device such as an HDD or an SSD.

Storage 270 stores a system program 272 implementing the control in order to drive robot 200. System program 272 includes the command executing the control arithmetic operation related to the operation of robot 200 and the command related to the interface with robot 200.

Interface circuit 268 exchanges the data with robot 200.

(e3: Servo Controller 350)

Figure 8:
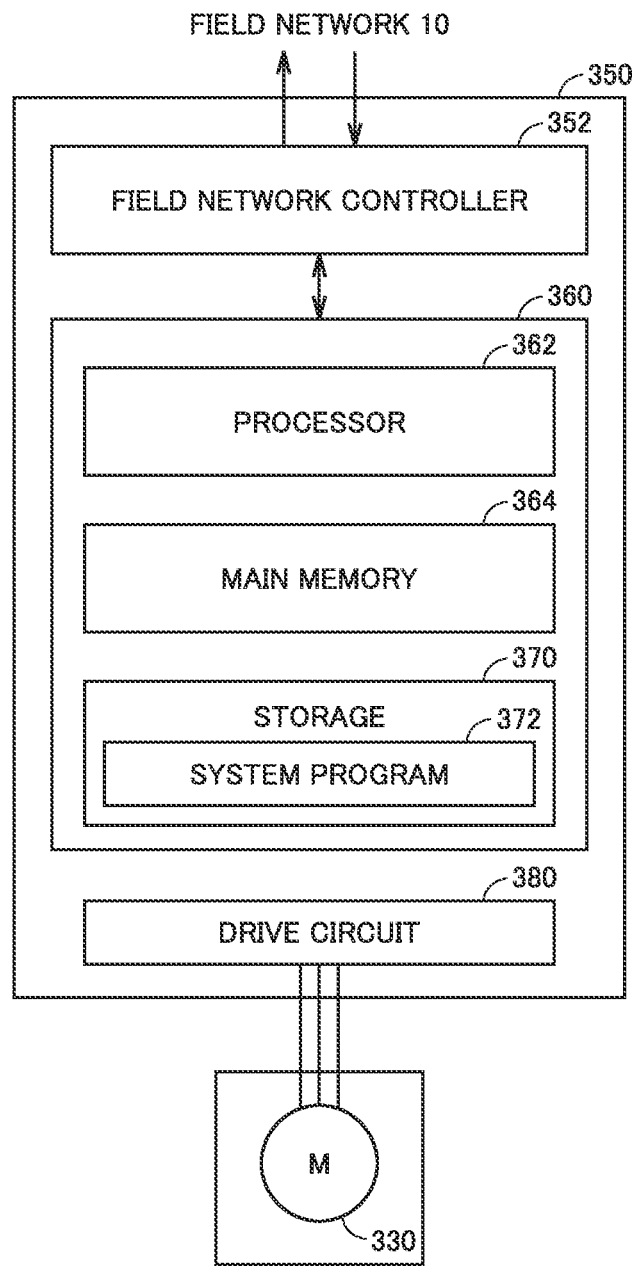
FIG. 8 is a schematic diagram illustrating a hardware configuration example of a servo controller constituting the robot control system of the embodiment.

FIG. 8 is a schematic diagram illustrating a hardware configuration example of servo controller 350 constituting robot control system 1 of the embodiment. With reference to FIG. 8, servo controller 350 includes a field network controller 352, a control processing circuit 360, and a drive circuit 380.

Field network controller 352 mainly exchanges the data with control device 100 through field network 10.

Control processing circuit 360 performs the arithmetic processing required for controlling servomotor 330 that drives displacement generation mechanism 300. As an example, control processing circuit 360 includes a processor 362, a main memory 364, and a storage 370.

Processor 362 executes the control arithmetic operation related to servomotor 330 that drives displacement generation mechanism 300. Main memory 364 is constituted of the volatile storage device such as a DRAM or an SRAM. For example, storage 370 includes the non-volatile storage device such as an HDD or an SSD.

Storage 370 stores a system program 372 implementing the drive control of the servomotor 330. System program 372 includes the command executing the control arithmetic operation related to the operation of displacement generation mechanism 300 and the command related to the interface with displacement generation mechanism 300.

Drive circuit 380 includes a converter circuit, an inverter circuit, and the like, generates power of designated voltage, current, and phase according to the instruction value calculated by control processing circuit 360, and supplies the power to servomotor 330.

Servomotor 330 is mechanically coupled to any shaft constituting displacement generation mechanism 300. A motor having a characteristic corresponding to displacement generation mechanism 300 can be adopted as servomotor 330. Not limited to a name of the servomotor, any of an induction type motor, a synchronous type motor, a permanent magnet type motor, and a reluctance motor may be adopted, and not only a rotation type but also a linear motor may be adopted.

(e4: Image Processing Device 450)

Figure 9:
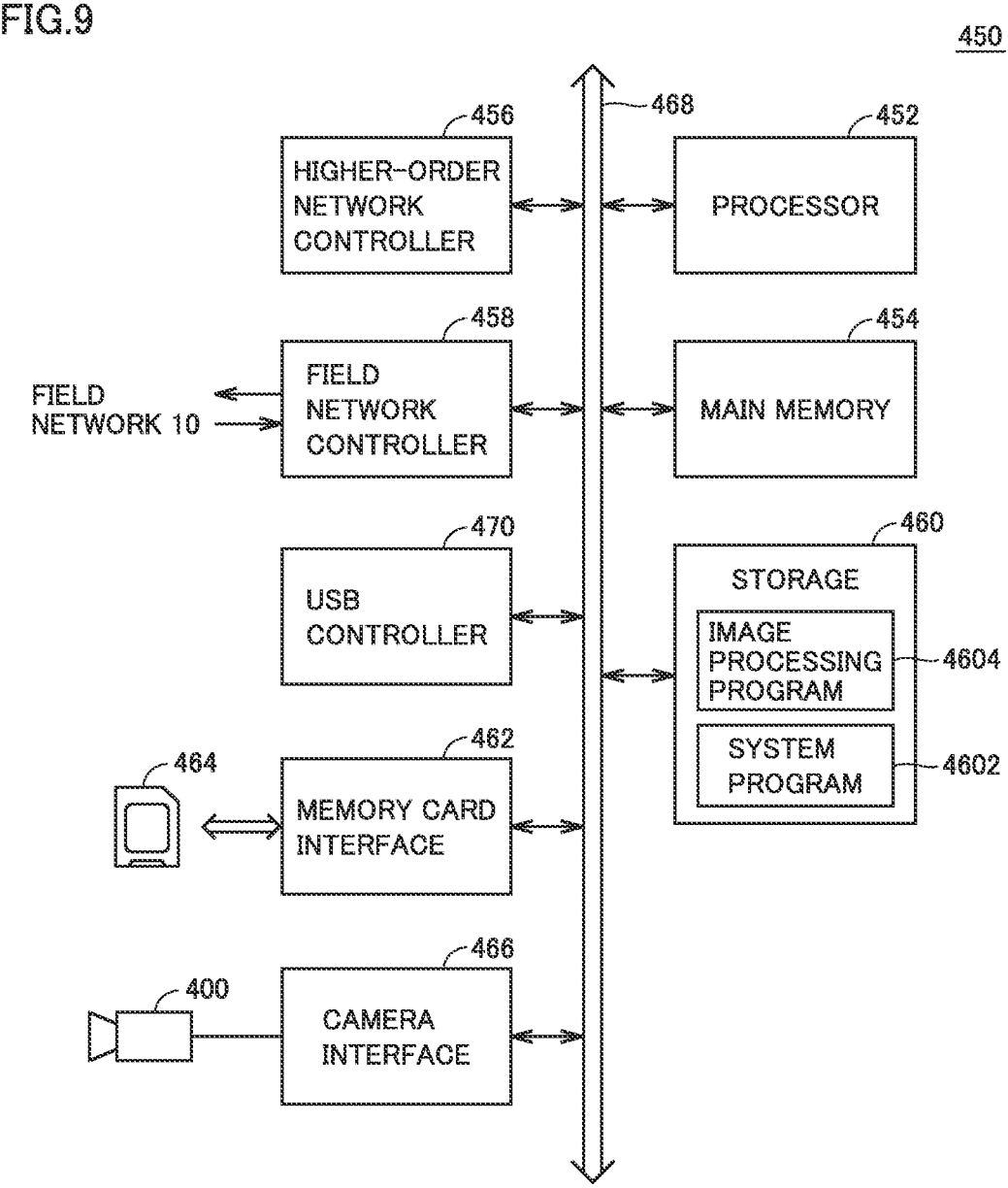
FIG. 9 is a schematic diagram illustrating a hardware configuration example of an image processing device constituting the robot control system of the embodiment.

FIG. 9 is a schematic diagram illustrating a hardware configuration example of image processing device 450 constituting robot control system 1 of the embodiment. With reference to FIG. 9, image processing device 450 includes a processor 452, a main memory 454, a storage 460, a memory card interface 462, a higher-order network controller 456, a field network controller 458, a USB controller 470, and a camera interface 466. These components are connected to each other through a processor bus 468.

Processor 452 corresponds to an arithmetic processing unit that executes the image processing, and is constituted of a CPU, a GPU, and the like. Specifically, processor 452 reads various programs stored in storage 460, expands the various programs in main memory 454, and executes the various programs, thereby implementing the control arithmetic operation.

Main memory 454 is constituted of the volatile storage device such as a DRAM or an SRAM. For example, storage 460 is constituted of the non-volatile storage device such as an HDD or an SSD. A system program 4602 implementing a basic function and an image processing program 4604 produced according to the control target are stored in storage 460.

Memory card interface 462 receives memory card 464 that is an example of a detachable recording medium.

Higher-order network controller 456 exchanges the data with any information processing device through the higher-order network. Field network controller 458 exchanges the data with each device through field network 10.

USB controller 470 exchanges the data with any information processing device through the USB connection.

Camera interface 466 acquires the image captured by camera 400 and provides camera 400 with various instructions.

(e5: Support Device 500)

Support device 500 constituting robot control system 1 of the embodiment may be implemented using a general-purpose personal computer as an example. Because a basic hardware configuration example of support device 500 is well known, the basic hardware configuration will not be described in detail herein.

(e6: Display Device 600)

Display device 600 constituting robot control system 1 of the embodiment may be implemented using a general-purpose personal computer as an example. Because a basic hardware configuration example of the display device 600 is well known, the basic hardware configuration will not be described in detail herein.

(e7: Server Device 700)

Server device 700 constituting robot control system 1 of the embodiment may be implemented using a general-purpose personal computer as an example. Because a basic hardware configuration example of the server device 700 is well known, the basic hardware configuration will not be described in detail herein.

(e8: Other Forms)

Although the configuration example in which required functions are provided by one or the plurality of processors executing the program has been described in FIGS. 6 to 9, some or all of these provided functions may be implemented using a dedicated hardware circuit (for example, an application specific integrated circuit (ASIC) and a field-programmable gate array (FPGA)).

F. OVERVIEW OF PROCESSING

An outline of processing for assembling two components using robot control system 1 of the embodiment will be described below.

Figure 10:
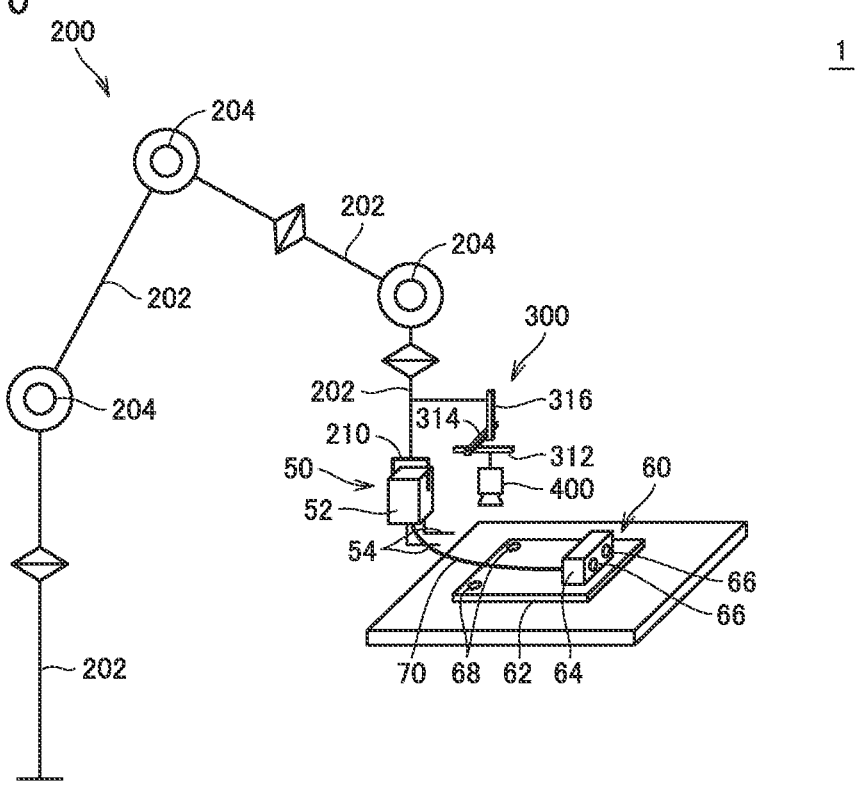
FIG. 10 is a view illustrating assembly processing using the robot control system of the embodiment.
Figure 11:
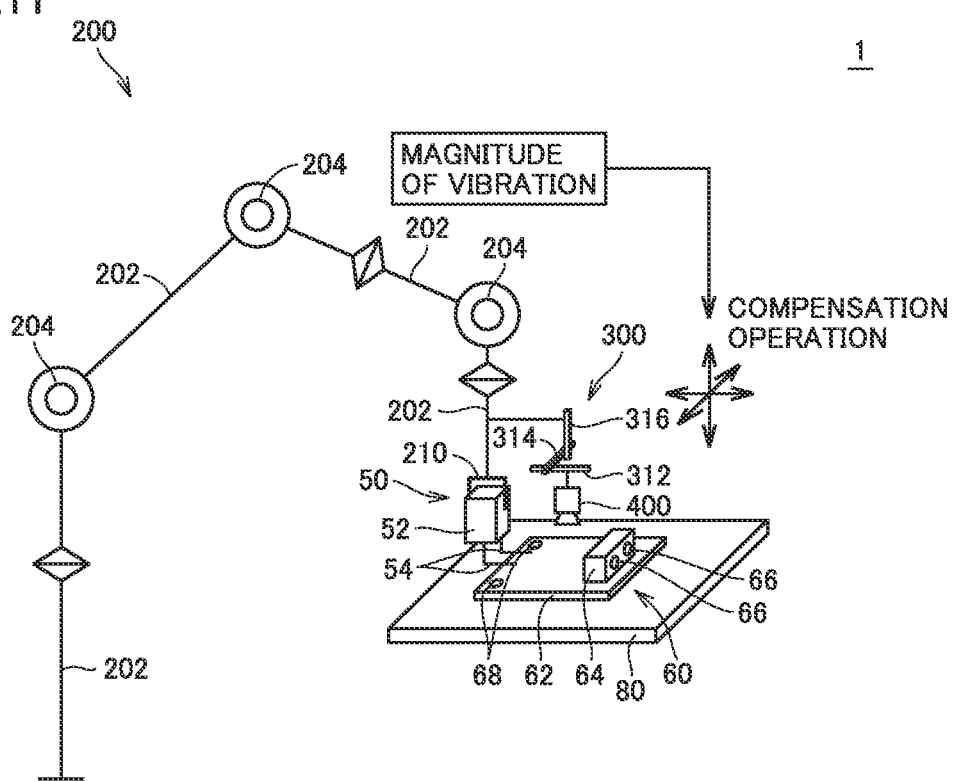
FIG. 11 is a view illustrating the assembly processing using the robot control system of the embodiment.
Figure 12:
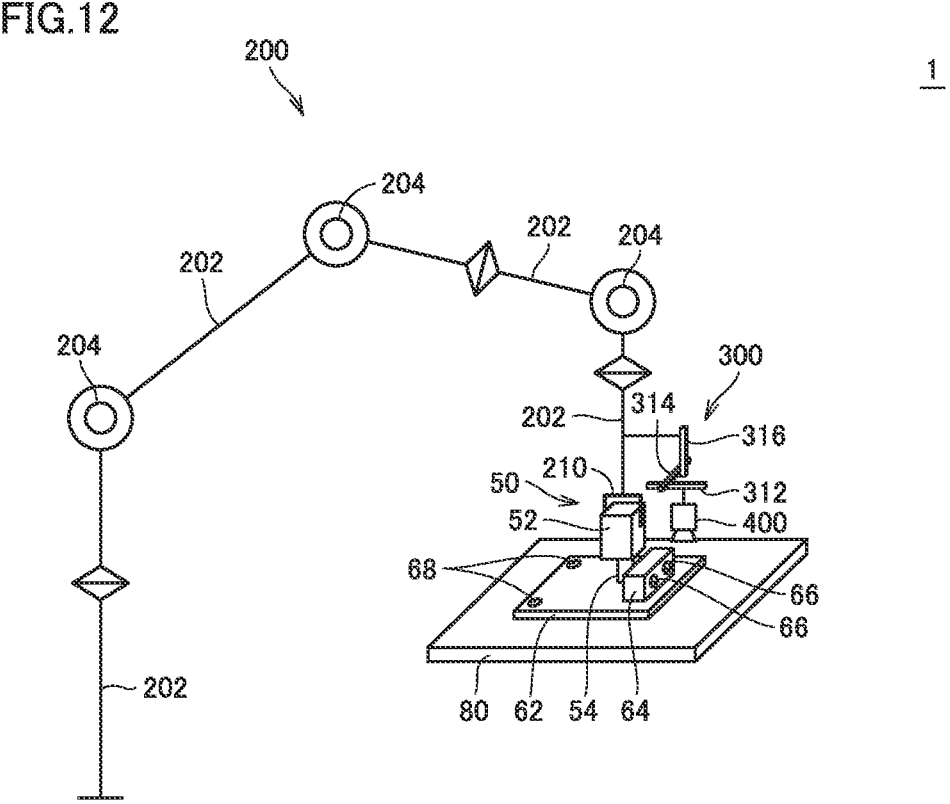
FIG. 12 is a view illustrating the assembly processing using the robot control system of the embodiment.

FIGS. 10 to 12 are views illustrating the assembly processing using robot control system 1 of the embodiment.

With reference to FIG. 10, first a processing for specifying the position where second workpiece 60 is disposed to determine the relative position between first workpiece 50 and second workpiece 60 is performed. More specifically, the image of second workpiece 60 is captured with camera 400, and positioning marker 68 provided on substrate 62 of second workpiece 60 is recognized, whereby the position of second workpiece 60 disposed on work table 80 is determined.

When the position of second workpiece 60 is determined, a trajectory 70 can be calculated in order to cause first workpiece 50 to approach second workpiece 60. That is, trajectory 70 is calculated in order to combine first workpiece 50 gripped by robot 200 and second workpiece 60. Then, assembly processing is started using robot 200 and displacement generation mechanism 300.

In the assembly processing, robot 200 moves along calculated trajectory 70. Displacement generation mechanism 300 reduces the vibration caused in camera 400 when robot 200 moves along trajectory 70. As will be described later, the magnitude of the vibration caused in camera 400 (the magnitude of the deviation from the original position) may be calculated (or estimated) using the state value (for example, encoder information or the like) acquired from robot 200, or may be calculated (or estimated) using information obtained from the image captured by camera 400.

With reference to FIG. 11, while robot 200 grips and moves first workpiece 50, the magnitude of the vibration (the magnitude of the deviation from the original position) caused in camera 400 is sequentially calculated, and movable shafts 312, 314, 316 of displacement generation mechanism 300 are sequentially driven in order to compensate for the calculated vibration. When movable shafts 312, 314, 316 of displacement generation mechanism 300 are sequentially driven, the vibration caused in camera 400 is compensated for.

In addition, when robot 200 is moved along trajectory 70, the arithmetic processing is performed by reflecting a correction amount (the deviation in the opposite direction to the caused vibration) corresponding to the calculated magnitude of the vibration caused in camera 400 (the magnitude of the deviation from the original position).

In this manner, displacement generation mechanism 300 is sequentially driven so as to reduce the vibration of camera 400 caused by moving robot 200 at a relatively high speed. Thus, highly accurate positioning processing of robot 200 can be implemented.

Finally, as illustrated in FIG. 12, the pair of pins 54 of first workpiece 50 is inserted into the pair of holes 66 of second workpiece 60, and the assembly processing is completed.

G. EXCHANGE OF DATA IN ROBOT CONTROL SYSTEM

In robot control system 1 of the embodiment, a plurality of devices cooperate to implement the processing. Information about the position managed by each device is often defined in coordinate systems independent from each other. Accordingly, positioning control may be implemented using a common reference coordinate system.

Figure 13:
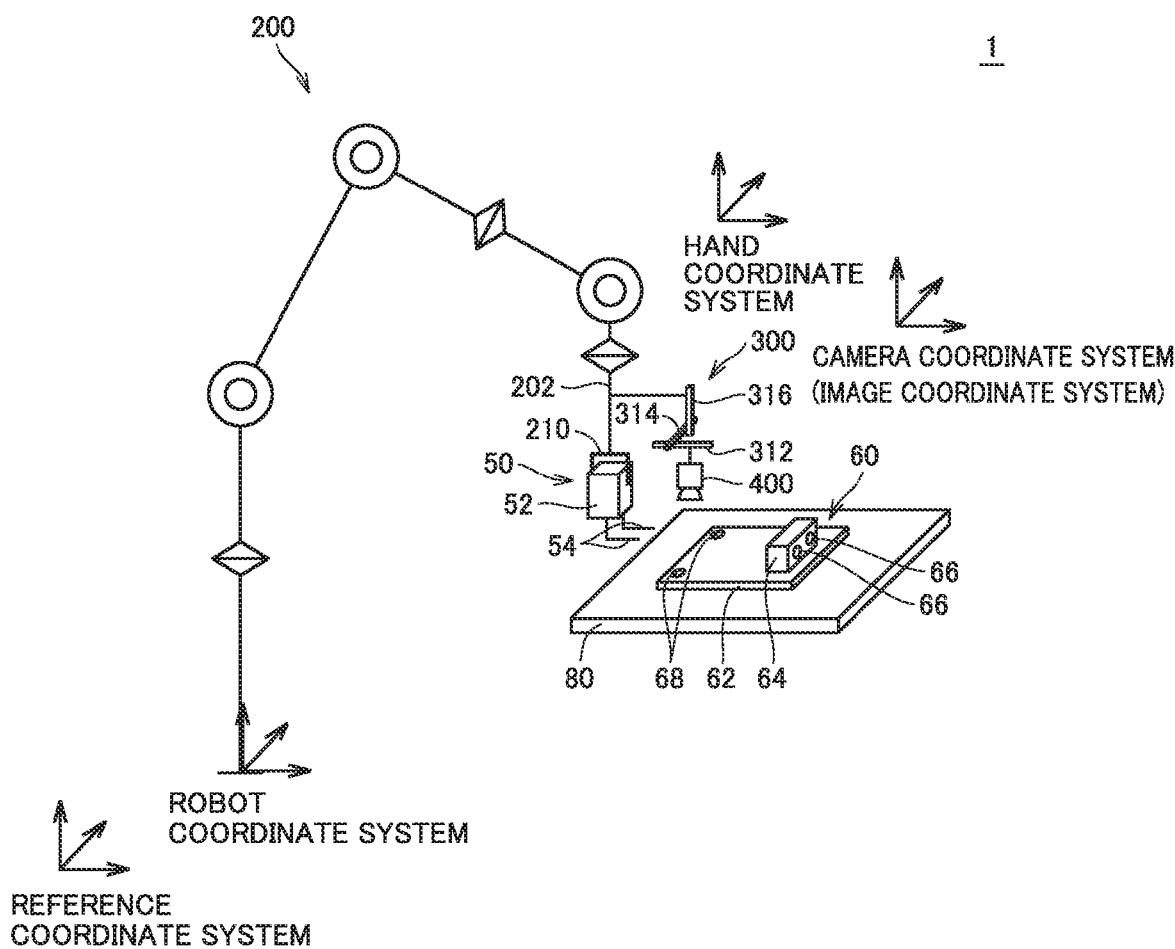
FIG. 13 is a view illustrating an example of a coordinate system defined in the robot control system of the embodiment.

FIG. 13 is a view illustrating an example of the coordinate system defined in robot control system 1 of the embodiment. With reference to FIG. 13, the positioning control of entire robot control system 1 is implemented by the common reference coordinate system.

Regarding robot 200, the tip position of robot 200 (the position where hand 210 and displacement generation mechanism 300 are mechanically connected) is defined by a robot coordinate system defined based on the installation position of robot 200. The position of displacement generation mechanism 300 connected to the tip of robot 200 is defined by a hand coordinate system defined based on the tip position of robot 200. Furthermore, the displacement generation mechanism 300 is connected to the tip of robot 200.

Accordingly, the position of first workpiece 50 is defined by the robot position (robot coordinate system). The calculated position of second workpiece 60 is defined by the robot position (robot coordinate system) and the camera coordinate system (alternatively, the image coordinate system) defined based on the inside of the image captured by camera 400.

The calculation of the relative position, the positioning control, and the like may be performed after the position defined by each coordinate system as described above is converted into the position defined by the common reference coordinate system.

Figure 14:
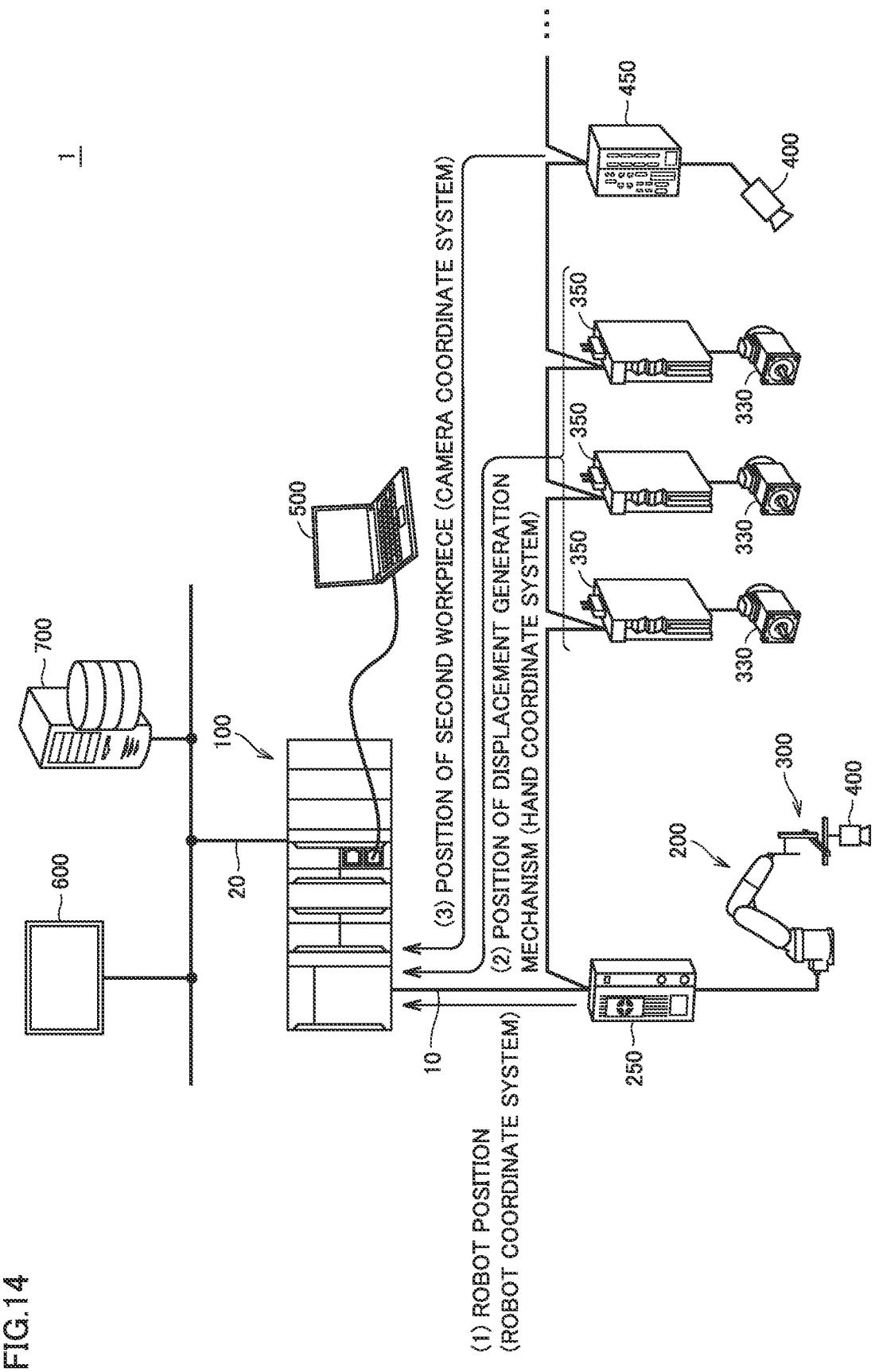
FIG. 14 is a view illustrating an example of position information exchanged in the robot control system of the embodiment.

FIG. 14 is a view illustrating an example of position information exchanged in robot control system 1 of the embodiment. With reference to FIG. 14, robot controller 250 acquires (1) the robot position (robot coordinate system) from robot 200, and periodically sends the robot position to control device 100.

Each of servo controllers 350 acquires the state value of corresponding servomotor 330 and periodically sends the state value to control device 100. A set of state values of each servomotor 330 constituting displacement generation mechanism 300 becomes (2) the position (hand coordinate system) of the displacement generation mechanism.

Image processing device 450 specifies the position where second workpiece 60 is disposed by the image recognition processing based on the image captured by camera 400, and (3) periodically sends the position (camera coordinate system) of second workpiece 60 to control device 100.

Control device 100 performs processing required for the positioning control after converting each position to the position of the reference coordinate system using a conversion equation previously acquired based on a positional relationship of robot disposition, calibration, and the like.

In this way, when the configuration example in FIG. 14 is adopted, the information about the required position can be uniformly managed and processed by control device 100 using the common reference coordinate system. Thus, control performance can be enhanced.

H. CONFIGURATION EXAMPLE OF DISPLACEMENT GENERATION MECHANISM 300

Displacement generation mechanism 300 adopted in robot control system 1 of the embodiment is not limited to the orthogonal mechanism movable in three axial directions, but may be a moving mechanism movable in one axial direction or a two-axis moving mechanism movable in two axial directions. Alternatively, an orthogonal robots that can move in more axial directions may be adopted. Furthermore, a mechanism capable of generating the displacement along one or more rotation axes may be adopted as displacement generation mechanism 300.

Figure 15:
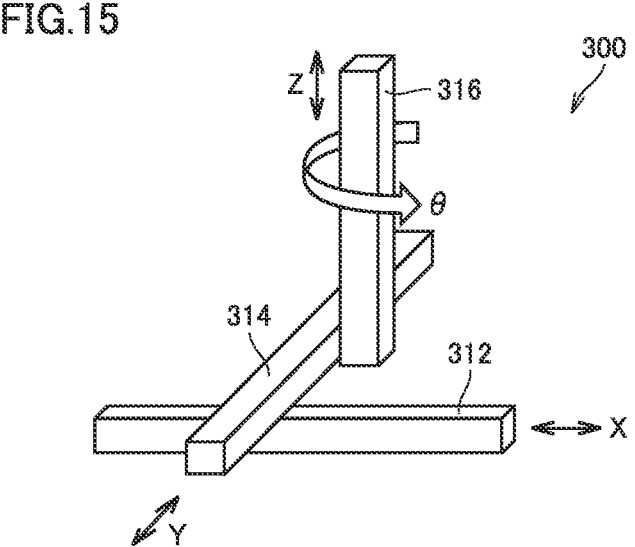
FIG. 15 is a schematic diagram illustrating a configuration example of a displacement generation mechanism adopted in the robot control system of the embodiment.

FIG. 15 is a schematic diagram illustrating a configuration example of displacement generation mechanism 300 adopted in robot control system 1 of the embodiment. With reference to FIG. 15, when it is desired that the degree of freedom is increased, a configuration including movable shaft 312 that moves along the X-axis, movable shaft 314 that moves along the Y-axis, and movable shaft 316 that moves along the Z-axis can be adopted. Furthermore, movable shaft 316 may be configured to be rotatable about the Z-axis.

On the other hand, when it is desired that the accuracy for a specific shaft is improved, a configuration in which only the shaft for which the accuracy is desired to be improved is movable may be adopted.

In this manner, the configuration of displacement generation mechanism 300 may be determined according to the intended use.

I. PROCESSING PROCEDURE

A processing procedure in robot control system 1 of the embodiment will be described below.

i1: Overview

Robot control system 1 of the embodiment reduces the vibration caused in camera 400 disposed at the tip of robot 200 when robot 200 holding first workpiece 50 is moved.

Figure 16:
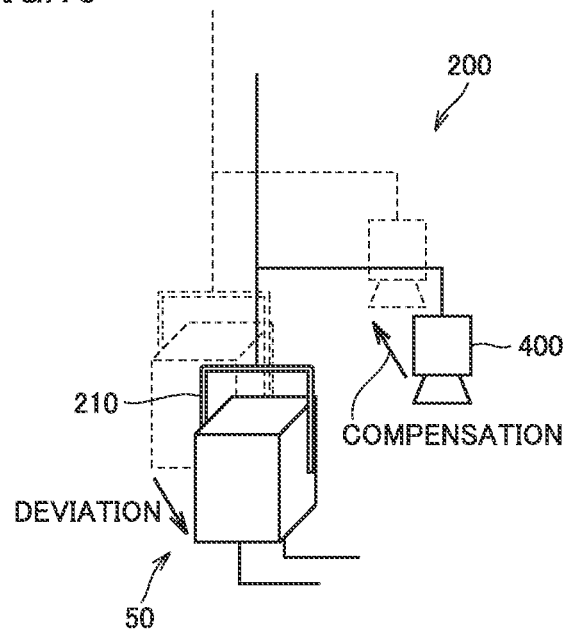
FIG. 16 is a view illustrating processing for reducing vibration caused in a camera in the robot control system of the embodiment.

FIG. 16 is a view illustrating processing for reducing the vibration caused in camera 400 in robot control system 1 of the embodiment. With reference to FIG. 16, when the tip of robot 200 is deviated from the original position due to deflection caused in a link or the like of robot 200 or the vibration of robot 200 itself while robot 200 moves, the position of camera 400 is changed (compensated for) according to the magnitude of the positional displacement (vibration). The vibration caused in camera 400 is reduced by sequentially performing the compensation of the position.

For example, the magnitude of the vibration at the tip of the robot 200 may be calculated (or estimated) using the state value (for example, encoder information or the like) acquired from robot 200, or calculated (or estimated) using the information obtained from the image captured by camera 400.

Using each method, a method for reducing the vibration by calculating the magnitude of the vibration at the tip of robot 200 and by changing (compensating for) the position of camera 400 based on the calculated magnitude of the vibration will be described below.

i2: Calculation of Magnitude of Vibration Based on State Value and Vibration Reduction Processing A processing example in which the vibration reduction processing is performed using the state values (for example, encoder information or the like) acquired from robot 200 and displacement generation mechanism 300 will be described.

A mounting example, in which the magnitude of the vibration caused at the tip of robot 200 is calculated and the position of camera 400 is sequentially controlled by regarding the calculated magnitude as the magnitude of the vibration, will be described in the following processing example.

That is, control device 100 calculates the magnitude of the vibration caused in camera 400 based on the state value of the movable portion of robot 200.

Figure 17:
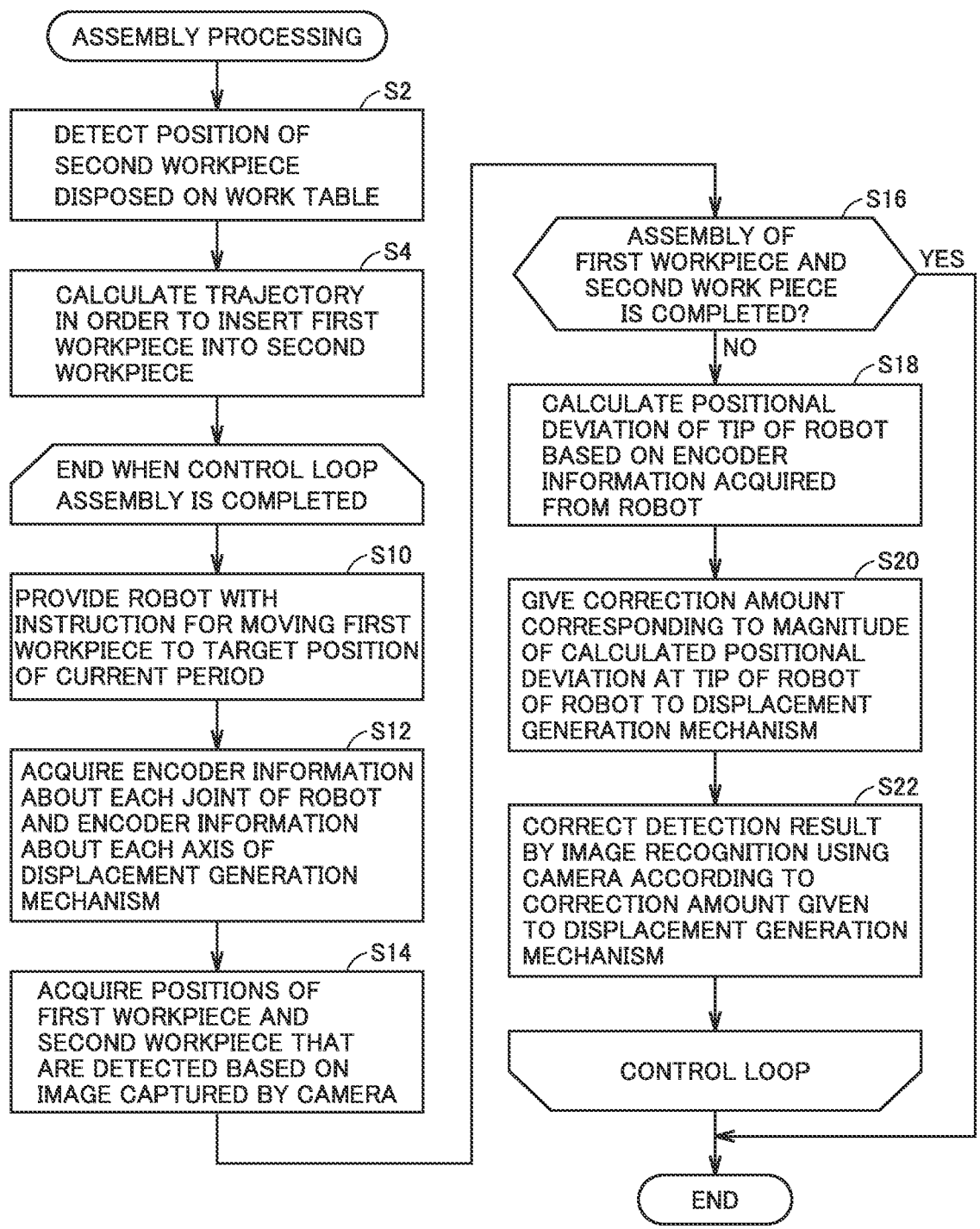
FIG. 17 is a flowchart illustrating a processing procedure of assembly processing in the robot control system of the embodiment.

FIG. 17 is a flowchart illustrating a processing procedure of the assembly processing in robot control system 1 of the embodiment. Typically, processor 102 of control device 100 executes the program to implement each step in FIG. 17. A series of processing in FIG. 17 is repeatedly executed at a predetermined period (control period).

With reference to FIG. 17, control device 100 detects the position of second workpiece 60 disposed on work table 80 (step S2), and calculates trajectory 70 in order to insert first workpiece 50 into second workpiece 60 (step S4). The position of second workpiece 60 may be detected by performing processing for searching for marker 68 on the image captured by camera 400. Alternatively, the position of second workpiece 60 may be input from an external device to control device 100, or a predetermined initial position may be adopted as it is. When first workpiece 50 and second workpiece 60 approach each other, the position of second workpiece 60 is detected by the image recognition using camera 400.

Then, the pieces of processing of the following steps S10 to S22 are repeated until first workpiece 50 is inserted into second workpiece 60.

More specifically, control device 100 provides robot 200 with the instruction for moving first workpiece 50 to the target position of the current period (step S10). That is, control device 100 provides robot 200 with the control instruction such that first workpiece 50 approaches second workpiece 60.

Then, control device 100 acquires the encoder information of each joint of robot 200 and the encoder information of each axis of displacement generation mechanism 300 (step S12).

Control device 100 acquires the positions of first workpiece 50 and second workpiece 60 that are detected based on the image captured by camera 400 (step S14), and determines whether the assembly of first workpiece 50 and second workpiece 60 is completed (step S16). When the assembly of first workpiece 50 and second workpiece 60 is completed (YES in step S16), the processing ends.

When the assembly of first workpiece 50 and second workpiece 60 is not completed (NO in step S16), control device 100 calculates the magnitude of the vibration at the tip of robot 200 based on the encoder information acquired from robot 200 (step S18). That is, control device 100 calculates the magnitude of the vibration caused in camera 400 when robot 200 causes first workpiece 50 to approach second workpiece 60.

For example, the magnitude of the vibration at the tip is calculated based on the position of the tip calculated based on the encoder information about each joint of robot 200 and/or the deflection caused in each link of robot 200. The deflection caused in each link of robot 200 can be calculated based on a temporal change in encoder information or the like.

Then, control device 100 gives the correction amount (the deviation in the direction opposite to the caused vibration) corresponding to the calculated magnitude of the vibration at the tip of robot 200 to displacement generation mechanism 300 (step S20). That is, control device 100 provides displacement generation mechanism 300 with the control instruction for compensating for the calculated vibration.

Furthermore, control device 100 corrects the detection result by the image recognition using camera 400 according to the correction amount provided to displacement generation mechanism 300 (step S22). That is, the relative positional relationship between camera 400 and the tip of robot 200 changes by an amount corresponding to the correction amount given to displacement generation mechanism 300. Because the detection result by the image recognition is also affected by the change in the relative positional relationship, a component opposite to the correction amount given to displacement generation mechanism 300 is given as correction information for the purpose of offsetting the influence. As described above, control device 100 acquires the current position of robot 200 while excluding the influence of the control instruction provided to displacement generation mechanism 300.

Then, the pieces of processing from step S10 are repeated.

i3: Vibration Calculation and Vibration Reduction Processing Based on Camera 400

A mounting example, in which the magnitude of the vibration caused at the tip of robot 200 is calculated using the information obtained from the image captured by camera 400 and the position of camera 400 is sequentially controlled by regarding the calculated magnitude as the magnitude of the vibration, will be described in the following processing example. That is, control device 100 calculates the magnitude of the vibration caused in camera 400 based on the image captured by camera 400.

Figure 18:
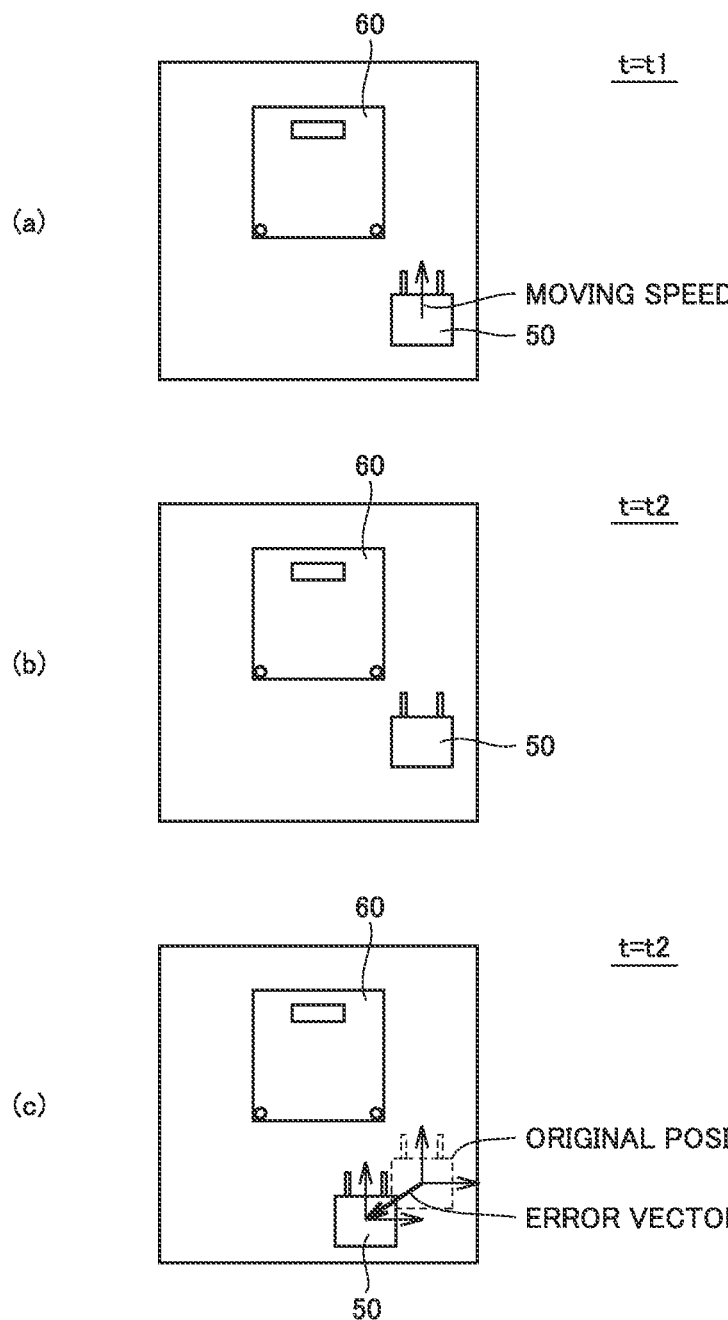
FIG. 18 is a view illustrating processing for calculating magnitude of vibration caused at a tip of a robot in the robot control system of the embodiment, where

FIG. 18 is a view illustrating processing for calculating the magnitude of the vibration caused at the tip of robot 200 in robot control system 1 of the embodiment. FIGS. 18(*a*) to 18(*c*) illustrate examples of the images captured by camera 400.

FIG. 18(*a*) illustrates the example of the image captured at time t=t1. In the captured image, first workpiece 50 and second workpiece 60 exist as subjects. It is assumed that image processing device 450 detects the positions of first workpiece 50 and second workpiece 60 by the image recognition. It is also assumed that image processing device 450 detects a moving speed of first workpiece 50.

FIG. 18(*b*) illustrates the example of the image captured at time t=t2 when the vibration is not caused in camera 400. In the captured image, first workpiece 50 moves by a distance corresponding to the moving speed detected in FIG. 18(*a*). In the image of FIG. 18(*b*), the position where first workpiece 50 exists corresponds to the original position at time t=t2. The position of first workpiece 50 in FIG. 18(*b*) can be calculated from the moving speed at time t=t1.

FIG. 18(*c*) illustrates the example of the image captured at time t=t2 when the vibration is caused in camera 400. In the captured image, first workpiece 50 is deviated from the original position in FIG. 18(*b*). The deviation of first workpiece 50 from the original position is calculated as an error vector. The magnitude of the vibration at the tip of robot 200 is calculated (estimated) based on the calculated error vector.

As illustrated in FIG. 18, control device 100 calculates the moving speed of first workpiece 50 based on the image captured by camera 400, and calculates the original position of first workpiece 50 from the calculated moving speed of first workpiece 50. Control device 100 calculates the error vector that is the deviation between the current position of first workpiece 50 and the original position of first workpiece 50.

As described above, the vibration caused at the tip of robot 200 when robot 200 holding first workpiece 50 is moved can be calculated from the image captured by camera 400. The calculated vibration is compensated for using displacement generation mechanism 300.

Figure 19:
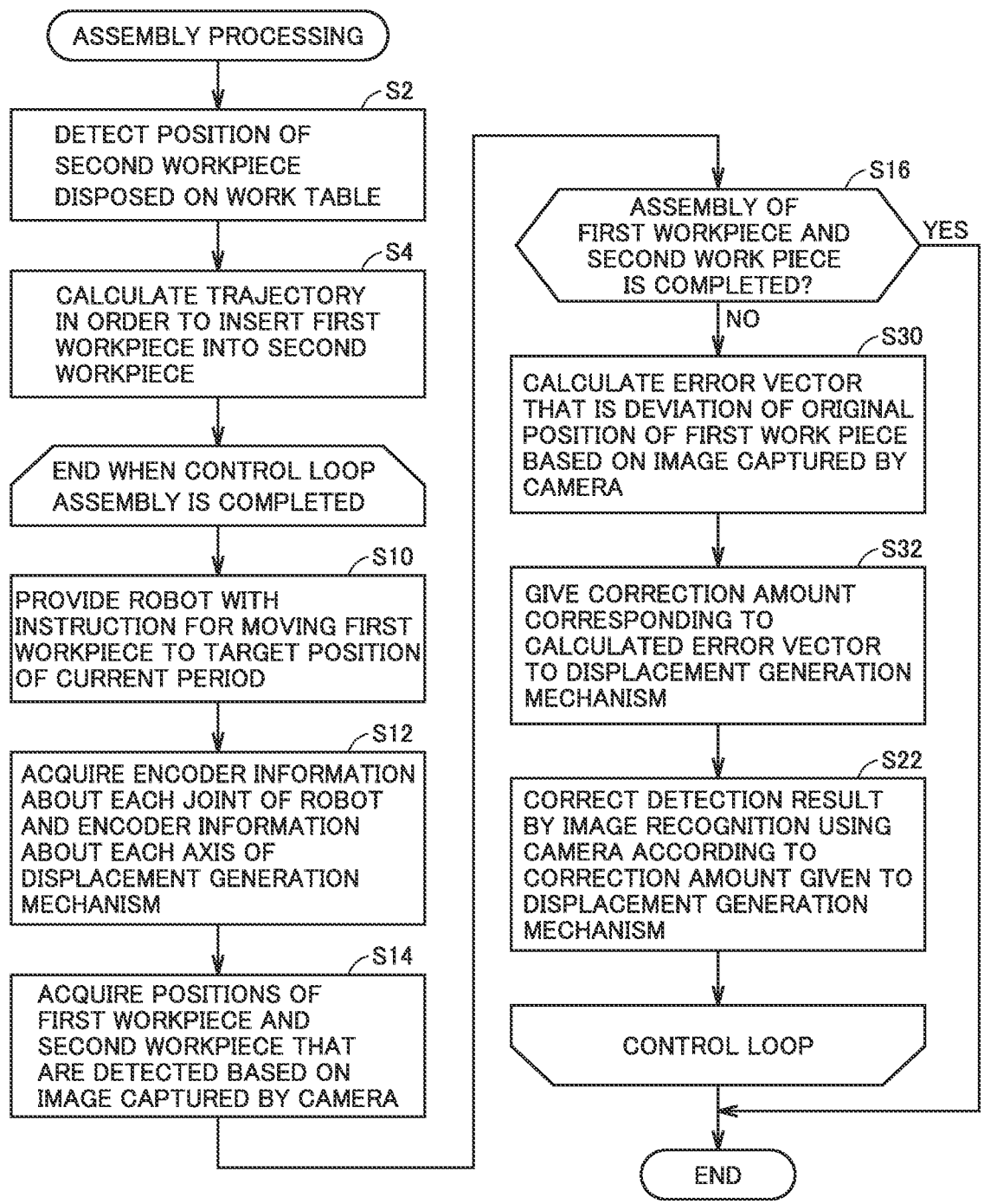
FIG. 19 is a flowchart illustrating another processing procedure of the assembly processing in the robot control system of the embodiment.

FIG. 19 is a flowchart illustrating another processing procedure of the assembly processing in robot control system 1 of the embodiment. Typically, processor 102 of server device 100 executes the program to implement each step in FIG. 19. A series of processing in FIG. 19 is repeatedly executed at a predetermined period (control period).

With reference to FIG. 19, control device 100 detects the position of second workpiece 60 disposed on work table 80 (step S2), and calculates trajectory 70 in order to insert first workpiece 50 into second workpiece 60 (step S4). The position of second workpiece 60 may be detected by performing processing for searching for marker 68 on the image captured by camera 400. Alternatively, the position of second workpiece 60 may be input from an external device to control device 100, or a predetermined initial position may be adopted as it is. When first workpiece 50 and second workpiece 60 approach each other, the position of second workpiece 60 is detected by the image recognition using camera 400.

Then, the pieces of processing of the following steps S10 to S22 are repeated until first workpiece 50 is inserted into second workpiece 60.

More specifically, control device 100 provides robot 200 with the instruction for moving first workpiece 50 to the target position of the current period (step S10). That is, control device 100 provides robot 200 with the control instruction such that first workpiece 50 approaches second workpiece 60.

Then, control device 100 acquires the encoder information of each joint of robot 200 and the encoder information of each axis of displacement generation mechanism 300 (step S12).

Control device 100 acquires the positions of first workpiece 50 and second workpiece 60 that are detected based on the image captured by camera 400 (step S14), and determines whether the assembly of first workpiece 50 and second workpiece 60 is completed (step S16). When the assembly of first workpiece 50 and second workpiece 60 is completed (YES in step S16), the processing ends.

When the assembly of first workpiece 50 and second workpiece 60 is not completed (NO in step S16), control device 100 calculates the error vector that is the deviation from the original position of first workpiece 50 based on the image captured by camera 400 (step S30). That is, control device 100 calculates the magnitude of the vibration caused in camera 400 when robot 200 causes first workpiece 50 to approach second workpiece 60.

More specifically, control device 100 calculates the moving speed of first workpiece 50 for each period, and calculates the original position of first workpiece 50 based on the moving speed of first workpiece 50 calculated in the previous period.

Then, control device 100 gives the correction amount (the deviation in the direction opposite to the caused vibration) corresponding to the calculated error vector to displacement generation mechanism 300 (step S32). That is, control device 100 provides displacement generation mechanism 300 with the control instruction for compensating for the calculated vibration.

Furthermore, control device 100 corrects the detection result by the image recognition using camera 400 according to the correction amount given to displacement generation mechanism 300 (step S22). That is, the relative positional relationship between camera 400 and the tip of robot 200 changes by an amount corresponding to the correction amount given to displacement generation mechanism 300. Because the detection result by the image recognition is also affected by the change in the relative positional relationship, a component opposite to the correction amount given to displacement generation mechanism 300 is given as correction information for the purpose of offsetting the influence. As described above, control device 100 acquires the current position of robot 200 while excluding the influence of the control instruction provided to displacement generation mechanism 300.

Then, the pieces of processing from step S10 are repeated.

i4: Modification and Application Example

The processing example (FIG. 17) of calculating the magnitude of the vibration based on the state value and the processing example (FIG. 19) of calculating the magnitude of the vibration based on the information obtained from the image captured by camera 400 have been described as the processing example, and these processing examples may be appropriately combined.

For example, the processing example (FIG. 17) of calculating the magnitude of the vibration based on the state value and the processing example (FIG. 19) of calculating the magnitude of the vibration based on the information obtained from the image captured by camera 400 may be combined. Specifically, the processing example (FIG. 17) of calculating the magnitude of the vibration based on the state value may be executed until first workpiece 50 reaches the visual field range of camera 400, and after the arrival of first workpiece 50, the processing example (FIG. 19) of calculating the magnitude of the vibration based on the information obtained from the image captured by camera 400 may be executed.

As described above, any processing can be mounted according to a condition for combining first workpiece 50 and second workpiece 60 and the like.

In addition, the vibration reduction processing may be enabled only when the calculated magnitude of the vibration satisfies a predetermined condition (for example, a predetermined threshold is exceeded).

As illustrated in FIGS. 17 and 19, first control module 32, vibration calculation module 34, and second control module 36 that are included in control module 30 of FIG. 1 perform the processing in synchronization with a predetermined period.

J. VARIOUS CONFIGURATION EXAMPLES

In robot control system 1 described above, the configuration in which control device 100 mainly executes the control arithmetic operation has been exemplified. However, the present invention is not limited thereto, and required functions may be distributedly disposed in one or more devices.

FIG. 20 is a view illustrating a part of a variation in the configuration example of robot control system 1 of the embodiment. FIG. 20 illustrates five basic functions of robot control system 1 using symbols "LD", "RC", "RA", "MC", and "SA".

The "LD" includes a function for executing the control arithmetic operation related to the assembly processing as illustrated in FIGS. 17 and 19. In robot control system 1 described above, control device 100 is in charge of the "LD". More specifically, IEC program 1104 executed by processor 102 of control device 100 includes the command required for implementing "LD". The "LD" includes the function corresponding to vibration calculation module 34 in FIG. 1.

The "RC" includes the function for executing the control arithmetic operation related to the operation of robot 200. Specifically, the control arithmetic operation related to the operation of robot 200 includes the calculation of the trajectory of robot 200 and the calculation of the target angle at each time of each joint included in robot 200. The "RC" may be implemented by application program 1106 stored in control device 100 and system program 272 stored in robot controller 250.

The "RA" includes the function related to the interface with robot 200. Specifically, "RA" includes the function for converting the calculation result by the RC function into a value (voltage or the like) required for the actual operation of robot 200 to output the value, and the function for outputting the data (pulse value or the like) obtained from robot 200 to the RC function. The "RA" may be implemented by system program 272 stored in robot controller 250.

The "RC" and the "RA" include the functions corresponding to first control module 32 in FIG. 1.

The "MC" includes the function for executing the control arithmetic operation related to the operation of displacement generation mechanism 300. Specifically, the control arithmetic operation related to the operation of displacement generation mechanism 300 includes the calculation of the trajectory of displacement generation mechanism 300 and the calculation of the target angle or the target speed at each time of each axis included in displacement generation mechanism 300. The "MC" may be implemented by application program 1106 stored in control device 100 and system program 372 stored in servo controller 350.

The "SA" includes the function related to the interface with displacement generation mechanism 300. Specifically, the "SA" includes the function for converting the calculation result by the MC function into the value (voltage or the like) required for the actual operation of displacement generation mechanism 300 to output the value and the function for outputting the data (pulse value or the like) obtained from displacement generation mechanism 300 to the MC function. The "SA" may be implemented by system program 372 stored in servo controller 350.

The "MC" and the "MA" include the functions corresponding to second control module 36 in FIG. 1.

FIG. 20 illustrates 16 types of configuration examples as an example. For example, a configuration example number "1" is an implementation example corresponding to robot control system 1 described above, and control device 100 is in charge of the positioning control, control device 100 and robot controller 250 are in charge of the control of robot 200, and control device 100 and servo controller 350 are in charge of the control of displacement generation mechanism 300. As illustrated in FIG. 20, sometimes the same function is shared by a plurality of devices.

A configuration example number "2" means a configuration example in which control device 100 and robot controller 250 are integrated, and for example, robot controller 250 may be incorporated into control device 100 and implemented.

The same applies to other configuration examples, and all or a part of control device 100, robot controller 250, and servo controller 350 may be integrated.

The implementation example illustrated in FIG. 20 is an example, and the implemented may be performed using, for example, a plurality of control devices. Image processing device 450 may also be configured independently or integrated with control device 100.

As described above, robot control system 1 of the embodiment may adopt any implementation form as long as the required functions can be implemented by any method.

K. APPENDIX

The above embodiment includes the following technical ideas.

[Configuration 1]

A robot control system (1) including:

a robot (200) on which a camera (400) and a hand (210) for gripping a first workpiece (50) are mounted;

a displacement generation mechanism (300) disposed between a tip of the robot and the camera;

a first control module (32; 100) configured to provide the robot with a control instruction for causing the first workpiece to approach a second workpiece;

a vibration calculation module (34; 100) configured to calculate magnitude of vibration caused in the camera when the robot causes the first workpiece to approach the second workpiece; and a second control module (36; 100) configured to provide the displacement generation mechanism with a control instruction for compensating for the vibration calculated by the vibration calculation module.

[Configuration 2]

The robot control system according to configuration 1, in which the vibration calculation module is configured to calculate the magnitude of the vibration caused in the camera based on a state value of a movable module of the robot.

[Configuration 3]

The robot control system according to configuration 1, in which the vibration calculation module is configured to calculate the magnitude of the vibration caused in the camera based on an image captured by the camera.

[Configuration 4]

The robot control system according to configuration 3, in which the vibration calculation module is configured to calculate a moving speed of the first workpiece based on the image captured by the camera, and calculate an original position of the first workpiece from the calculated moving speed of the first workpiece.

[Configuration 5]

The robot control system according to configuration 4, in which the vibration calculation module is configured to calculate an error vector that is deviation between a current position of the first workpiece and the original position of the first workpiece.

[Configuration 6]

The robot control system according to any one of configurations 1 to 5, in which the robot is a vertical articulated robot, and the displacement generation mechanism includes an orthogonal mechanism.

[Configuration 7]

The robot control system according to any one of configurations 1 to 6, in which the first control module, the vibration calculation module, and the second control module are configured to perform processing in synchronization with each other at a predetermined period.

[Configuration 8]

The robot control system according to any one of configurations 1 to 7, in which the first control module is configured to acquire the current position of the robot while excluding an influence of the control instruction provided to the displacement generation mechanism.

[Configuration 9]

A control program (1102, 1104, 1106) executed by a computer (100) of a robot control system (1) including a robot (200) on which a camera (400) and a hand (210) for gripping a first workpiece (50) are mounted and a displacement generation mechanism (300) disposed between a tip of the robot and the camera, the control program causing the computer to execute:

providing (S10) the robot with a control instruction for causing the first workpiece to approach a second workpiece;

calculating (S18; S30) magnitude of vibration caused in the camera when the robot causes the first workpiece to approach the second workpiece; and providing (S22) the displacement generation mechanism with a control instruction for compensating for the calculated vibration.

[Configuration 10]

A control method executed in a robot control system (1) including a robot (200) on which a camera (400) and a hand (210) for gripping a first workpiece (50) are mounted and a displacement generation mechanism (300) disposed between a tip of the robot and the camera, the control method including:

providing (S10) the robot with a control instruction for causing the first workpiece to approach a second workpiece;

calculating (S18; S30) magnitude of vibration caused in the camera when the robot causes the first workpiece to approach the second workpiece; and providing (S22) the displacement generation mechanism with a control instruction for compensating for the calculated vibration.

L. ADVANTAGES

In robot control system 1 of the embodiment, the magnitude of the vibration of the tip caused in the case where robot 200 that conveys first workpiece 50 is moved at the high speed is sequentially calculated, and the control instruction to generate the appropriate displacement between the tip of robot 200 and camera 400 is given to compensate for the calculated magnitude of the vibration based on the calculated magnitude of the vibration. In this way, by combining robot 200 and displacement generation mechanism 300, the positioning control with higher accuracy can be implemented in the application assembling the components.

It should be considered that the disclosed embodiment is illustrative and non-restrictive in every respect. The scope of the present invention is defined by not the above description, but the claims, and it is intended that all modifications within the meaning and scope of the claims are included in the present invention.

REFERENCE SIGNS LIST

1: robot control system, 10: field network, 20: higher-order network, 30: control module, 32: first control module, 34: vibration calculation module, 36: second control module, 50: first workpiece, 52, 64: electronic component, 54: pin, 60: second workpiece, 62: substrate, 66: hole, 68: marker, 70: trajectory, 80: work table, 100: control device, 102, 262, 362, 452: processor, 104, 264, 364, 454: main memory, 106, 456: higher-order network controller, 108, 252, 352, 458: field network controller, 110, 270, 370, 460: storage, 112, 462: memory card interface, 114, 464: memory card, 116: local bus controller, 118, 468: processor bus, 120, 470: USB controller, 122: local bus, 130: functional unit, 200: robot, 202: link, 204: joint, 210: hand, 250: robot controller, 260, 360: control processing circuit, 268: interface circuit, 272, 372, 1102, 4602: system program, 300: displacement generation mechanism, 312, 314, 316: movable shaft, 330: servomotor, 350: servo controller, 380: drive circuit, 400: camera, 450: image processing device, 466: camera interface, 500: support device, 600: display device, 700: server device, 1104: IEC program, 1106: application program, 4604: image processing program

The invention claimed is:

1. A robot control system comprising:
   a robot on which a camera and a hand for gripping a first workpiece are mounted;
   a displacement generation mechanism disposed between a tip of the robot and the camera; and
   one or more controllers configured to:
   provide the robot with a control instruction for causing the first workpiece to approach a second workpiece;
   calculate a moving speed of the first workpiece based on an image captured by the camera;
   calculate a previous position of the first workpiece based on the calculated moving speed of the first workpiece;
   calculate a magnitude of vibration caused in the camera when the robot causes the first workpiece to approach the second workpiece, based on the calculated previous position and a current position of the first workpiece; and
   provide the displacement generation mechanism with a control instruction for compensating for the calculated magnitude of vibration.

2. The robot control system according to claim 1, wherein calculating the magnitude of the vibration caused in the camera is based on a state value of a movable portion of the robot.

3. The robot control system according to claim 1, wherein calculating the magnitude of the vibration caused in the camera comprises calculating an error vector that is deviation between the current position of the first workpiece and the previous position of the first workpiece.

4. The robot control system according to claim 1, wherein the robot is a vertical articulated robot, and
   the displacement generation mechanism includes an orthogonal mechanism.

5. The robot control system according to claim 1, wherein providing the robot with the control instruction, calculating the magnitude of vibration caused in the camera, and providing the displacement generation mechanism with the control instruction are performed in synchronization with each other at a predetermined period.

6. The robot control system according to claim 1, wherein the one or more controllers are configured to acquire the current position of the robot while excluding an influence of the control instruction provided to the displacement generation mechanism.

7. The robot control system according to claim 1, wherein the one or more controllers control the displacement generation mechanism to compensate for the calculated magnitude of vibration in a plurality of axial directions based on the control instruction.

8. A non-transitory storage medium storing a control program thereon, which when executed by a computer of a robot control system including a robot on which a camera and a hand for gripping a first workpiece are mounted and a displacement generation mechanism disposed between a tip of the robot and the camera, causes the computer to perform:
   providing the robot with a control instruction for causing the first workpiece to approach a second workpiece;
   calculating a moving speed of the first workpiece based on an image captured by the camera;
   calculating a previous position of the first workpiece based on the calculated moving speed of the first workpiece;
   calculating a magnitude of vibration caused in the camera when the robot causes the first workpiece to approach the second workpiece, based on the calculated previous position and a current position of the first workpiece; and
   providing the displacement generation mechanism with a control instruction for compensating for the calculated magnitude of vibration.

9. The non-transitory storage medium according to claim 8, wherein calculating the magnitude of the vibration caused in the camera is based on a state value of a movable portion of the robot.

10. The non-transitory storage medium according to claim 8, wherein calculating the magnitude of the vibration caused in the camera comprises calculating an error vector that is deviation between the current position of the first workpiece and the previous position of the first workpiece.

11. The non-transitory storage medium according to claim 8, wherein
    the robot is a vertical articulated robot, and
    the displacement generation mechanism includes an orthogonal mechanism.

12. The non-transitory storage medium according to claim 8, wherein the computer program, when executed by the computer, causes the computer to control the displacement generation mechanism to compensate for the calculated magnitude of vibration in a plurality of axial directions based on the control instruction.

13. A control method executed in a robot control system including a robot on which a camera and a hand for gripping a first workpiece are mounted and a displacement generation mechanism disposed between a tip of the robot and the camera, the control method comprising:
    providing the robot with a control instruction for causing the first workpiece to approach a second workpiece;
    calculating a moving speed of the first workpiece based on an image captured by the camera;
    calculating a previous position of the first workpiece based on the calculated moving speed of the first workpiece;
    calculating a magnitude of vibration caused in the camera when the robot causes the first workpiece to approach the second workpiece, based on the calculated previous position and a current position of the first workpiece; and
    providing the displacement generation mechanism with a control instruction for compensating for the calculated magnitude of vibration.

14. The control method according to claim 13, wherein calculating the magnitude of the vibration caused in the camera is based on a state value of a movable portion of the robot.

15. The control method according to claim 13, wherein calculating the magnitude of the vibration caused in the camera comprises calculating an error vector that is deviation between the current position of the first workpiece and the original position of the first workpiece.

16. The control method according to claim 13, wherein
the robot is a vertical articulated robot, and
the displacement generation mechanism includes an orthogonal mechanism.

17. The control method according to claim 13, further comprising controlling the displacement generation mechanism to compensate for the calculated magnitude of vibration in a plurality of axial directions based on the control instruction.

* * * * *